United States Patent
Lee et al.

(10) Patent No.: US 8,320,509 B2
(45) Date of Patent: *Nov. 27, 2012

(54) CONCATENATION-ASSISTED SYMBOL-LEVEL COMBINING FOR MIMO SYSTEMS WITH HARQ AND/OR REPETITION CODING

(75) Inventors: Jungwon Lee, Cupertino, CA (US);
Woong Jun Jang, Stanford, CA (US);
Leilei Song, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,527

(22) Filed: Jan. 20, 2012

(65) Prior Publication Data

US 2012/0121005 A1 May 17, 2012

Related U.S. Application Data

(63) Continuation of application No. 11/724,882, filed on Mar. 16, 2007, now Pat. No. 8,121,209.

(60) Provisional application No. 60/820,285, filed on Jul. 25, 2006, provisional application No. 60/820,434, filed on Jul. 26, 2006, provisional application No. 60/821,767, filed on Aug. 8, 2006.

(51) Int. Cl.
*H04L 27/06* (2006.01)

(52) U.S. Cl. ........ 375/340; 375/229; 375/230; 375/232; 375/233; 375/260; 375/341; 375/346; 375/347; 375/350; 370/210; 370/334; 370/335; 370/342; 370/464; 370/480; 455/101; 455/132; 455/296; 455/500; 455/501; 455/562.1; 327/551

(58) Field of Classification Search .................. 375/229, 375/230, 232, 233, 260, 340, 341, 346, 347, 375/350; 370/210, 334, 335, 342, 464, 480; 455/101, 132, 296, 500, 501, 562.1; 327/551
See application file for complete search history.

(56) References Cited

U.S. PATENT DOCUMENTS

| | | | |
|---|---|---|---|
| 6,185,258 B1 | 2/2001 | Alamouti et al. |
| 6,567,388 B1 | 5/2003 | Tomcik et al. |
| 6,687,492 B1 | 2/2004 | Sugar et al. |
| 6,778,619 B2 | 8/2004 | Zangi et al. |
| 6,868,520 B1 | 3/2005 | Fauconnier |
| 6,892,341 B2 | 5/2005 | Golitschek et al. |
| 6,967,598 B2 | 11/2005 | Mills |
| 7,031,419 B2 | 4/2006 | Piirainen |
| 7,194,237 B2 | 3/2007 | Sugar et al. |

(Continued)

FOREIGN PATENT DOCUMENTS

EP 1 271 835 1/2003

(Continued)

OTHER PUBLICATIONS

Jang et al., "Optimal Combining Schemes for MIMO Systems with Hybrid ARQ", ISIT 2007, IEEE International Symposium, Jun. 24-Jun. 29, 2007, pp. 2286-2290.

(Continued)

*Primary Examiner* — Leon Flores

(57) ABSTRACT

Systems and methods are provided for decoding signal vectors in multiple-input multiple-output (MIMO) systems, where the receiver has received one or more signal vectors from the same transmitted vector. The receiver combines the received vectors by vector concatenation The concatenated vector may then be decoded using, for example, maximum-likelihood decoding. In some embodiments, the combined signal vector is equalized before decoding.

20 Claims, 22 Drawing Sheets

U.S. PATENT DOCUMENTS

| | | |
|---|---|---|
| 7,295,624 B2 | 11/2007 | Onggosanusi et al. |
| 7,308,047 B2 | 12/2007 | Sadowsky |
| 7,362,815 B2 | 4/2008 | Lindskog et al. |
| 7,366,247 B2 | 4/2008 | Kim et al. |
| 7,382,841 B2 | 6/2008 | Ohtaki et al. |
| 7,428,269 B2 | 9/2008 | Sampath et al. |
| 7,489,746 B1 | 2/2009 | Awater et al. |
| 7,502,432 B2 | 3/2009 | Catreux et al. |
| 7,526,038 B2 | 4/2009 | McNamara |
| 7,539,274 B2 | 5/2009 | Catreux et al. |
| 7,548,592 B2 | 6/2009 | Wight |
| 7,554,985 B2 | 6/2009 | Ihm et al. |
| 7,567,583 B2 | 7/2009 | Miyoshi |
| 7,573,806 B2 | 8/2009 | Ihm et al. |
| 7,590,204 B2 | 9/2009 | Monsen |
| 7,593,489 B2 | 9/2009 | Koshy et al. |
| 7,649,953 B2 | 1/2010 | Bauch |
| 7,729,411 B2 | 6/2010 | Wang et al. |
| 7,742,550 B2 | 6/2010 | Olesen et al. |
| 7,751,506 B2 | 7/2010 | Niu et al. |
| 7,826,557 B2 | 11/2010 | Li et al. |
| 2004/0181419 A1 | 9/2004 | Davis et al. |
| 2006/0107167 A1 | 5/2006 | Jeong et al. |
| 2006/0165192 A1 | 7/2006 | Ito |
| 2006/0251156 A1 | 11/2006 | Grant et al. |
| 2006/0274836 A1 | 12/2006 | Sampath et al. |
| 2007/0268988 A1 | 11/2007 | Hedayat et al. |
| 2008/0025427 A1 | 1/2008 | Lee et al. |
| 2008/0025429 A1 | 1/2008 | Lee et al. |
| 2008/0025443 A1 | 1/2008 | Lee et al. |
| 2008/0037670 A1 | 2/2008 | Lee et al. |
| 2008/0063103 A1 | 3/2008 | Lee et al. |
| 2008/0144733 A1 | 6/2008 | ElGamal et al. |
| 2008/0198941 A1 | 8/2008 | Song et al. |
| 2009/0031183 A1 | 1/2009 | Hoshino et al. |
| 2009/0063106 A1 | 3/2009 | Burg et al. |
| 2009/0080579 A1 | 3/2009 | Fujii |
| 2009/0252236 A1 | 10/2009 | Li et al. |
| 2009/0307558 A1 | 12/2009 | Lee et al. |
| 2010/0014601 A1 | 1/2010 | Mo et al. |

FOREIGN PATENT DOCUMENTS

| | | |
|---|---|---|
| EP | 1 501 210 | 1/2005 |
| EP | 1 608 081 | 12/2005 |
| WO | WO 00/52873 | 9/2000 |
| WO | WO 02/067491 | 8/2002 |

OTHER PUBLICATIONS 802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Acolatse, Kodzovi et al. "An Alamouti-based Hybrid-ARQ Scheme for MIMO Systems" 14th IST Mobile and Wireless Communications, Dresden (Jun. 2005).

Arkhipov, Alexander et al. "OFDMA-CDM Performance Enchancement by Combining H-ARQ and Interference Cancellation" IEEE Journal on Selected Areas in Communications, vol. 24, No. 6, pp. 1199-1207 (Jun. 2006).

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Cioffi, John et al. "Generalized decision-feedback equalization for packet transmission with ISI and gaussian noise", Communications, computation, control and signal processing: a tribute to Thomas Kailath, pp. 79-127 (1997).

Davis, Linda M. "Scaled and decoupled Cholesky and QR Decompositions with Application to Spherical MIMO Detection" IEEE Wireless Communications and Networking, vol. 1, pp. 326-331 (2003).

Dekorsy, Armin "A Cutoff Rate based Cross-Layer Metric for MIMO-HARQ Transmission" IEEE 16th Internal Symposium on Personal, Indoor and Mobile Radio Communications, vol. 4, pp. 2166-2170 (2005).

Gharavi-Alkhansari, Mohammad et al. "Constellation Space Invariance of Space-Time Block Codes with Application to Optimal Antenna Subset Selection", Signal Processing Advances in Wireless Communications, pp. 269-273 (2003).

Ginis, George et al. "On the Relation Between V-BLAST and the GDFE", IEEE Communications Letters, vol. 5, No. 9, pp. 364-366 (Sep. 2001).

Hassibi, Babak "An Efficient Square-Root Algorithm for BLAST", IEEE International Conference on Acoustics, Speech, and Signal Processing, vol. 2, pp. 737-740 (2000).

Jang et al. "An Efficient Symbol-Level Combining Scheme for MIMO Systems With Hybrid ARQ", IEEE Transactions on Wireless Communications, vol. 8, No. 5, pp. 2443-2451, May 26, 2009.

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Krishnaswamy, Dilip, et al. "Multi-Level Weighted Combining of Retransmitted Vectors in Wireless Communications." IEEE VTC. Sep. 2006.

Liu, Peng et al. "A New Efficient MIMO Detection Algorithm based on Cholesky Decomposition," The 6th International Conference on Advanced Communication Technology, vol. 1, pp. 264-268 (2004).

Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Nakajima, Akinori et al. "Throughput of Turbo Coded Hybrid ARQ Using Single-carrier MIMO Multiplexing" IEEE 61st Vehicular Technology Conference, vol. 1, pp. 610-614 (2005).

Oh, Mi-Kyung et al. "Efficient Hybrid ARQ with Space-Time Coding and Low-Complexity Decoding" IEEE Conference on Acoustics, Speech, and Signal Processing, vol. 4, pp. 589-592 (2004).

Onggosanusi, Eko N. et al. "Hybrid ARQ Transmission and Combining for MIMO systems" IEEE, 2003.

Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Samra H; Zhi Ding "New MIMO ARQ protocols and joint detection via sphere decoding" IEEE Transactions on Signal Processing [online], pp. 473-482 (Feb. 28, 2006).

Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).

Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).

Theofilakos, Panagiotis et al. "Frobenius Norm Based Receive Antenna Subarray Formation for MIMO Systems", First European Conference on Antennas and Propagation, pp. 1-5 (2006).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).

Wolniansky, P.W. et al. "V-BLAST: An Architecture for Realizing Very High Data Rates Over the Rich-Scattering Wireless Channel", URSI International Symposium on Signals, Systems, and Electronics, pp. 295-300 (1998).

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

Wübben, Dirk et al. "MMSE Extension of V-BLAST based on Sorted QR Decomposition" IEEE 58th Vehicular Technology Conference, vol. 1, pp. 508-512 (2003).

Zhou, S. et al., Subspace-Based (Semi-) Blind Channel Estimation for Block Precoded Space-Time OFDM, IEEE Transactions on Signal Processing, vol. 50, No. 5, May 2002, pp. 1215-1228.

$$\begin{pmatrix} y_1 \\ \vdots \\ y_{N_r} \end{pmatrix}_i = \begin{pmatrix} h_{11} & \cdots & h_{1N_t} \\ \vdots & \ddots & \vdots \\ h_{N_r 1} & \cdots & h_{N_r N_t} \end{pmatrix}_i \begin{pmatrix} x_1 \\ \vdots \\ x_{N_t} \end{pmatrix} + \begin{pmatrix} n_1 \\ \vdots \\ n_{N_r} \end{pmatrix}_i$$

CONCATENATION-ASSISTED SYMBOL-LEVEL COMBINING FOR MIMO SYSTEMS WITH HARQ AND/OR REPETITION CODING

CROSS-REFERENCE TO RELATED APPLICATIONS

This application claims the benefit of U.S. patent application Ser. No. 11/724,882, filed Mar. 16, 2007 (currently pending), and U.S. Provisional Application Nos. 60/820,285, filed Jul. 25, 2006, 60/820,434, filed Jul. 26, 2006, and 60/821,767, filed Aug. 8, 2006, which are incorporated herein by reference in their entirety.

BACKGROUND OF THE INVENTION

This invention relates to a technique for decoding a received signal vector in a multiple-input multiple-output (MIMO) data transmission or storage system, where the receiver may receive multiple instances of the same transmitted signal vector.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors.

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions. Therefore, it would be desirable to provide a system or method for effectively utilizing information from an arbitrary number of transmitted packets that does not drastically increase the complexity of the system.

SUMMARY OF THE INVENTION

Accordingly, systems and methods for reliable transmission in multiple-input multiple-output systems are disclosed, where a receiver obtains multiple signal vectors from the same transmit signal vector and combines them prior to decoding.

The transmitter, which has $N_t$ outputs, may send an $N_t$-dimensional signal vector to the receiver. The receiver, which has $N_r$ inputs, may receive an $N_r$-dimensional signal vector corresponding the $N_t$-dimensional transmit vector. In accordance with one aspect of the invention, the transmitter sends the same signal vector multiple times to the receiver according to some protocol. Two protocols that may be used are HARQ type-I and repetition coding, or a combination of the two.

In one embodiment of the present invention, when the receiver has N≧1 received vectors from the same transmit signal, the receiver concatenates the received signal vectors into one $NN_r$-dimensional vector. The receiver may decode the combined vector directly using a decoder, such as a maximum-likelihood decoder.

In a second embodiment of the invention, the N channel response matrices, also referred to as channel matrices, which define how each of the channels alter the transmitted signal in a noiseless scenario, are also concatenated into a single $NN_r \times N_t$ matrix. A preprocessor processes the concatenated channel response matrix, also called the concatenated channel matrix. Then, rather than directly decoding the concatenated $NN_r$-dimensional received vector, the concatenated received vector is equalized according to information obtained from preprocessing the concatenated channel matrix. The result of the equalization operation is a processed signal vector that may be decoded using the same decoder no matter how large or small N is. Thus, the complexity of the receiver may be drastically reduced.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

DETAILED DESCRIPTION

The disclosed invention provides a technique in a multiple-input multiple-output data transmission or storage system to decode a signal vector at a receiver, where the receiver may receive multiple signal vectors from the same transmitted signal vector.

Figure 1:
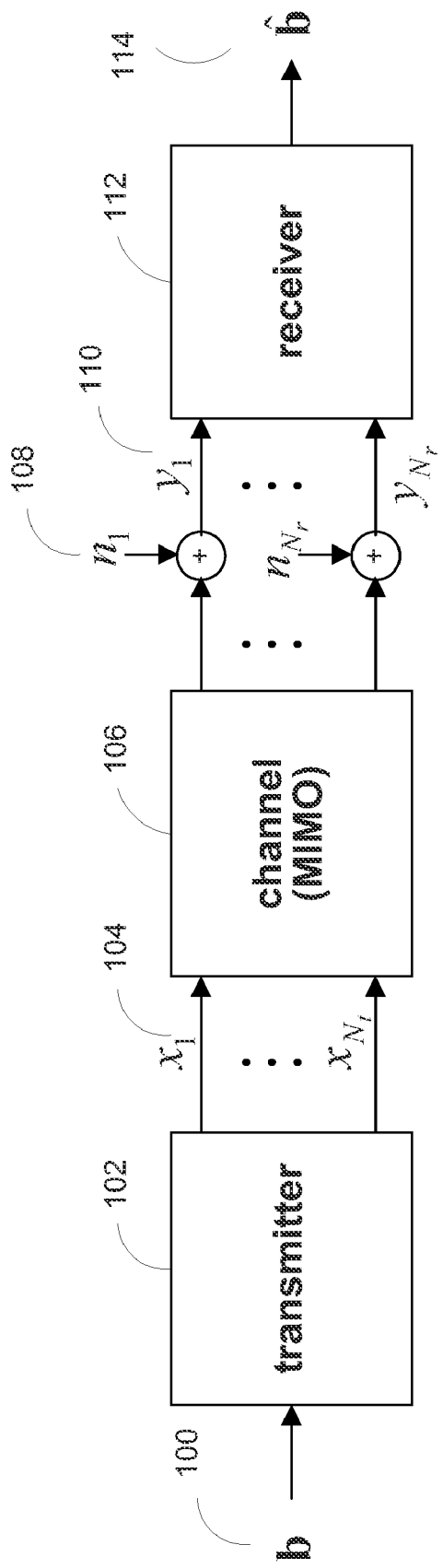
FIG. 1 is a high level block diagram of a multiple-input multiple-output data transmission or storage system in accordance with one embodiment of the invention.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_t$ outputs 104 and receiver 112 has $N_r$ inputs 110, so channel 106 is modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
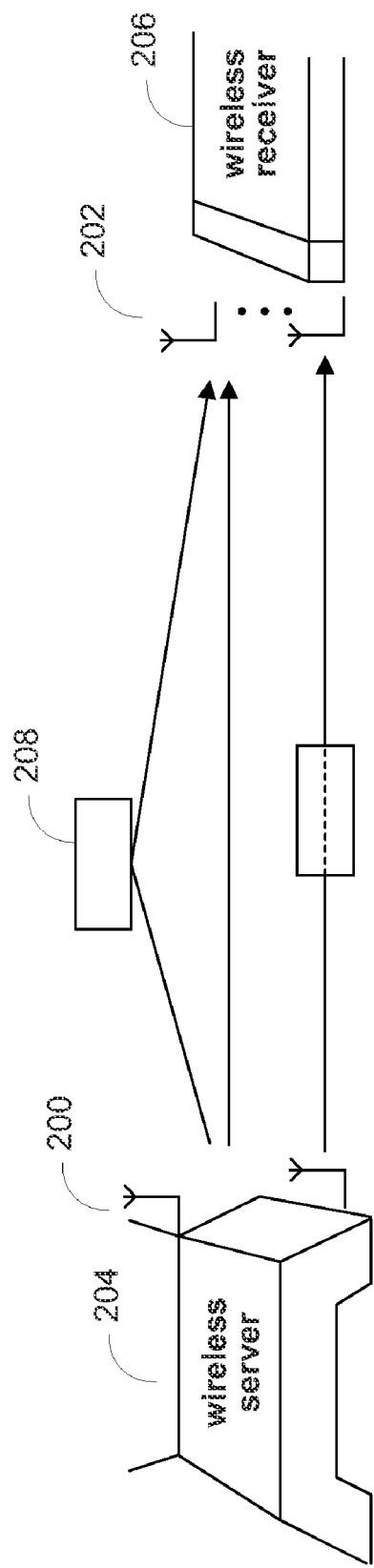
FIG. 2 is a wireless transmission system in accordance with one embodiment of the system in FIG. 1.

In one embodiment, FIG. 1 represents a wireless communication system, pictured in FIG. 2. In this preferred embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
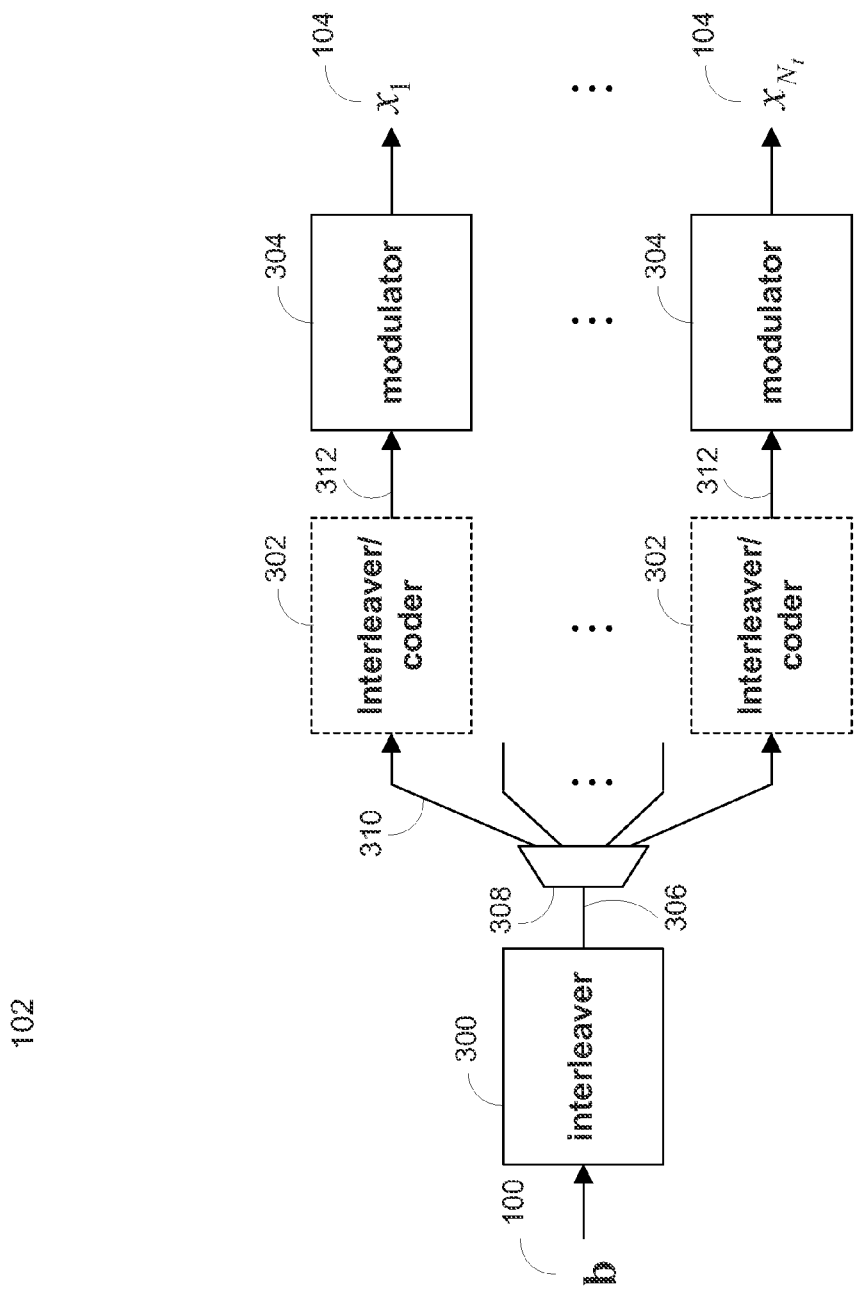
FIG. 3 is a block diagram of a transmitter in accordance with one embodiment of the invention.

One embodiment of transmitter 102 is shown in FIG. 3. Transmitter 102 converts bit sequence 100 into signals 104 appropriate for transmission through channel 106 (FIG. 1). Bit sequence 100 is passed through interleaver 300. Therefore, each bit in bit sequence 100 may be assumed to be independent of all other bits in bit sequence 100. Bit sequence 306 at the output of interleaver 300 is demultiplexed by demultiplexor 308 across $N_t$ paths. Each demultiplexed output 310 may or may not go through another interleaver and/or coding block 302, yielding bit sequences 312. Finally, bit sequences 312 are modulated with modulators 304, and are transmitted as signals $x_1, \ldots, x_{N_t}$, or x in vector form.

Figure 4A:
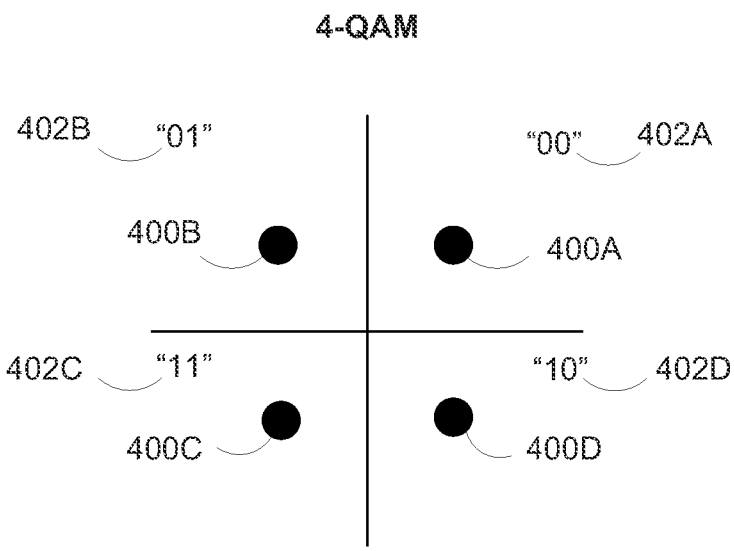
FIG. 4A is a signal constellation set for quadrature amplitude modulation with four signal points.

Modulators 304 group the incoming bits into symbols, which are mapped and converted to signals according to a signal constellation set and carrier signal. In one embodiment of the invention, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10.". However, any other one-to-one mapping from symbol to signal point is valid.

Figure 4B:
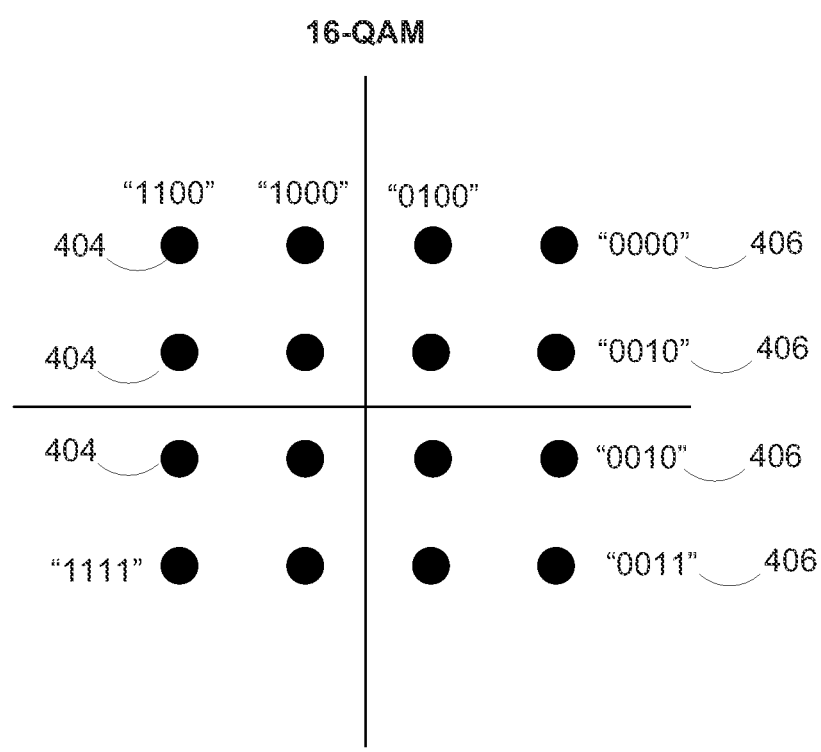
FIG. 4B is a signal constellation set for quadrature amplitude modulation with 16 signal points.

Similarly, FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where the each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting $mN_t$ bits concurrently.

In accordance with one embodiment of the present invention, transmitter 102 sends the same vector, x, multiple times according to a protocol that is also known and followed by receiver 112. Depending on the protocol, there may be additional components in transmitter 102 that are not shown in FIG. 3. It should be understood that transmitter 102 may be altered in order to implement such protocols. For example, if an automatic repeat request (ARQ) protocol is used, transmitter 102 may need a buffer to store x, or equivalently bit stream 100, in the event that a retransmission is requested.

Even though x is transmitted, receiver 112 in FIG. 1 actually receives $y_i$, where $$y_i = Hx + n_i \quad 1 \leq i \leq N \quad (1)$$

For clarity, FIG. 5 shows the components of each vector in equation (1). Index i represents the ith instance that the same transmitted vector, x, is transmitted. $y_i$ is an $N_r \times 1$ vector, where each vector component is the signal received by one of the $N_r$ inputs of receiver 112. $H_i$ 500 is an $N_r \times N_t$ channel matrix that defines how channel 106 alters the transmitted vector, x. $n_i$ is an $N_r \times 1$ vector of additive noise. Note that the characteristics of channel 106, reflected in matrix 500, and noise sources 108, and therefore received signal 110, may be different for each instance i. Differences arise because each transmission of x occurs at a different time or through a different medium.

In one embodiment, noise sources 108 may be modeled as additive white Gaussian noise (AWGN) sources. In this case, noise sources 108 are independent and identically distributed (i.i.d). That is, the noise that affects any of the $N_r$ components in any $n_i$ does not affect the noise for any other component in $n_i$. Also, all of the noise sources have the same probabilistic characteristics. Furthermore, each component of $n_i$ has zero mean and is random in terms of both magnitude and phase, where the magnitude and the phase are also independent. This type of noise source is called an i.i.d. zero mean circularly symmetric complex Gaussian (ZMCSCG) noise source. If the variance of each component is $N_0$, then the conditional probability distribution function (pdf) of the received signal, $Pr\{y|x,H\}$, is given by $$Pr\{y \mid x, H\} = \frac{1}{(\pi N_0)^N} \exp\left\{-\frac{\|y - Hx\|^2}{N_0}\right\} \quad (2)$$

Equation (2) will be used with reference to maximum-likelihood decoding discussed in greater detail below in connection with FIG. 10.

Receiver 112 may use one or more of the N received copies of x to determine the information that was transmitted. Receiver 112 may combine multiple received vectors into a single vector for decoding, thereby utilizing more than one, and possibly all, of the transmitted signal vectors. The combining scheme disclosed in the present invention will be discussed in greater detail below in connection with FIGS. 7-15.

Figure 6A:
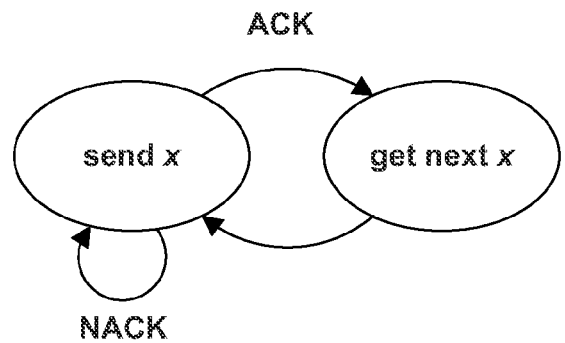
FIG. 6A is a flow diagram of a stop-and-wait HARQ transmitter.
Figure 6B:
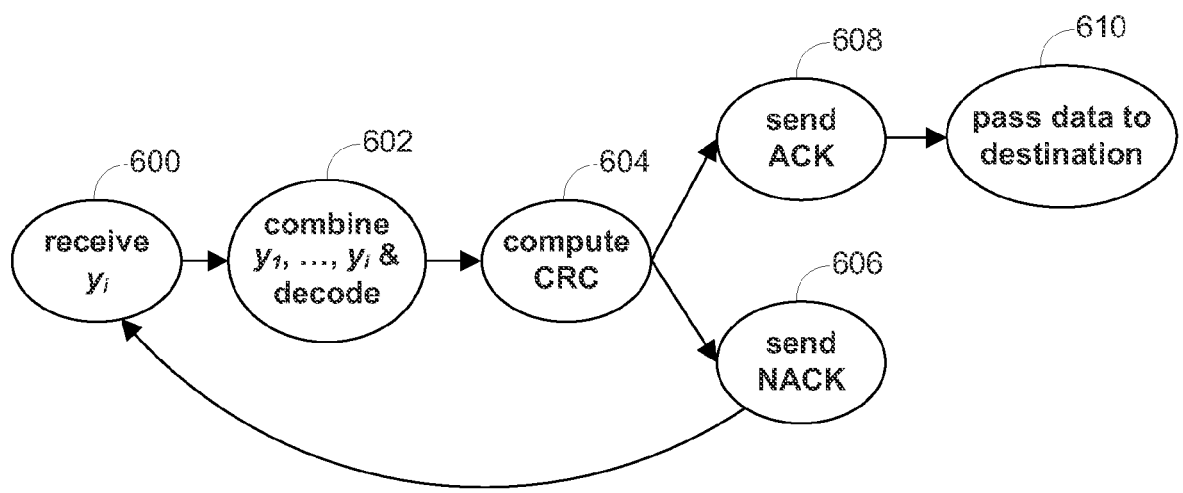
FIG. 6B is a flow diagram of a HARQ receiver.

In one embodiment of the invention, receiver 112 receives multiple instances of a common transmit vector using a retransmission protocol. For example, the transmitter and receiver may use a HARQ type-I protocol. The flow chart of the steps taken by transmitter 102 and receiver 112 are shown in FIG. 6A and FIG. 6B, respectively. FIG. 6A shows a transmitter following a stop-and-wait protocol, where the transmitter waits until a signal vector has been accepted by the receiver before sending the next signal vector. Other protocols, such as go-back-N, selective repeat, or any other suitable protocol may be used in place of stop-and-wait. Therefore, it should be understood that FIG. 6A may be modified in order to implement a different protocol.

FIG. 6B shows a simplified flow chart of a HARQ type-I receiver protocol in accordance with one aspect of the invention. At some time, receiver 112 receives $y_i$ at 600, corresponding to the ith transmission of x. At 602, receiver 112 combines all received vectors corresponding to transmitted signal x, that is $y_1, \ldots, y_i$, into a single vector, $\tilde{y}$, and decodes the combined vector. In FIG. 6B, decoding refers to determining the CRC-protected message based on the combined signal vector. Other possible decoding outputs will be discussed in greater detail below in connection with FIG. 7. Errors in the data may be corrected by combining the received signal vectors such that the combined signal vector, $\tilde{y}$, is correctable by decoding. Following decoding, error detection is performed at step 604, which in this case involves checking the CRC of the decoded vector. If errors are detected, the receiver sends a negative acknowledgement (NACK) message to the transmitter at 606. Upon receipt of the NACK, the transmitter sends the same transmitted signal vector, which is received at 600 as $y_{i+1}$. $y_{i+1}$ is different from $y_i$ even though the same transmit signal vector x is used at the transmitter, because $y_{i+1}$ is transmitted at a later time than $y_i$ and is affected by different noise and channel characteristics. The i+1 vectors are combined and decoded, as described previously. This procedure occurs N times, until by combining and decoding N received vectors, no CRC error is detected. At this point, the receiver sends an acknowledgment (ACK) message at 608 back to the transmitter to inform the transmitter that the vector has been successfully received. Also, since there are no errors in the data, the receiver passes the data to the destination at 610.

In a second embodiment of the invention, the transmitter sends a signal vector, x, a fixed number of times, irrespective of the presence of errors. For example, the receiver may obtain N transmissions of x from repetition coding. N copies of x are transmitted simultaneously, or within some interval of time. The receiver combines $y_1, \ldots, y_N$, and decodes the combination. Repetition coding may be useful when there is no feasible backchannel for the receiver to send retransmission requests.

HARQ type-I and repetition coding are two protocols that may be used in different embodiments of the present invention. Alternatively, repetition coding and HARQ can be combined such that multiple vectors are received at 500 before combining and decoding at 502. The invention, however, is not limited to the two protocols and their combination mentioned here. Currently, the IEEE 802.16e standard uses HARQ and repetition coding, so these particular protocols merely illustrate embodiments of the invention. Any protocol that allows the receiver to receive multiple copies of the same transmitted vector fall within the scope of the present invention.

Figure 7:
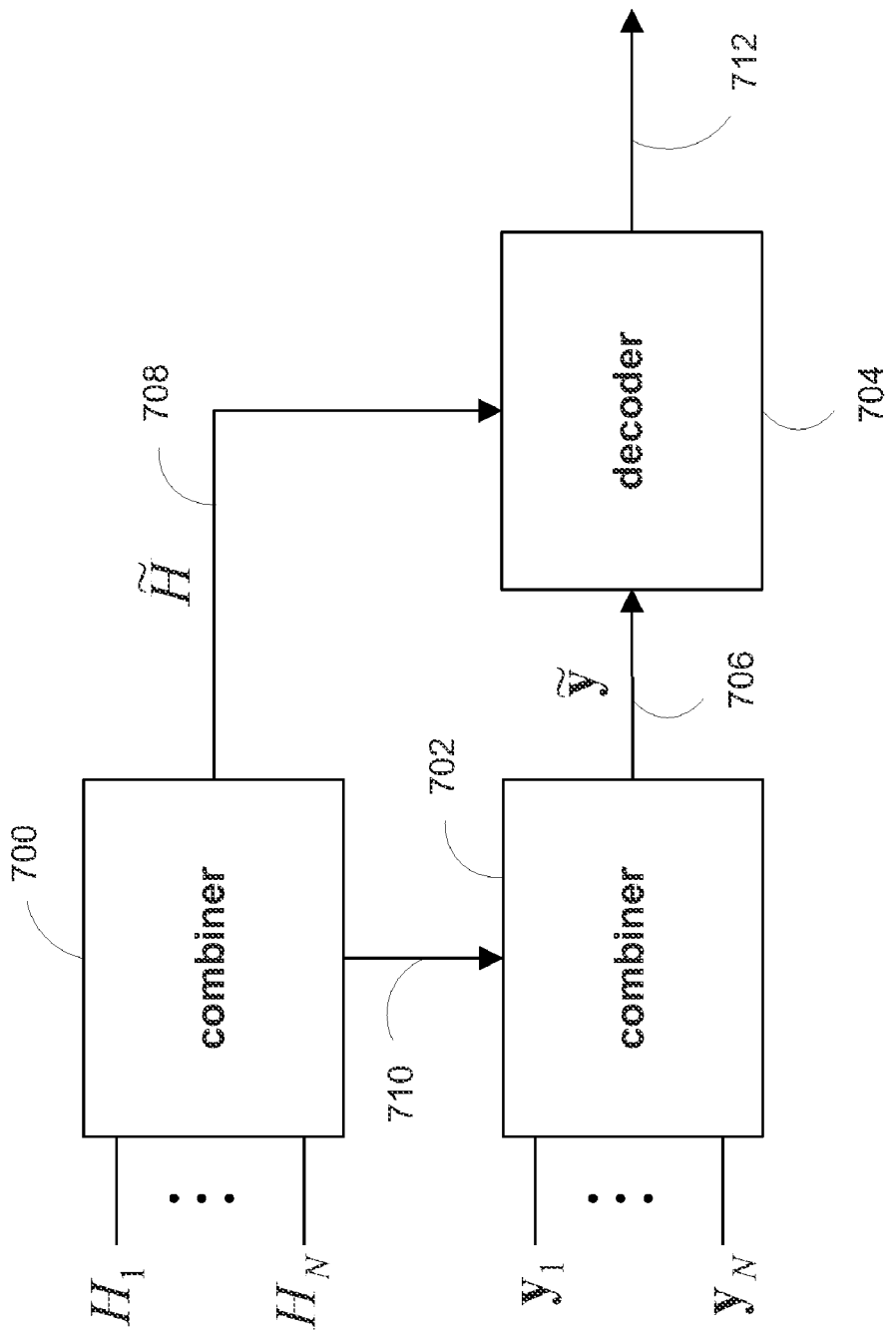
FIG. 7 is a high level block diagram of a receiver in accordance with the invention.

FIG. 7 is a block diagram of receiver 112 in accordance with one embodiment of the present invention. Furthermore, it illustrates one way to implement combining and decoding at 602 in FIG. 6B. Combiner 702, which may or may not use channel information 710 provided from channel combiner 700, combines the received vectors. This technique is called symbol-level combining, because the combiner operates on the symbols of the signal vector. Combined received vector 706 is decoded using decoder 704. Decoder 704 may use channel information 708 provided by combiner 700 to operate on combined received vector 706. A decoder refers to a component that uses a signal to make a decision as to the data that was transmitted. Accordingly, decoder 704 may return an estimate of the signal vector, x. It may return soft information or hard information. If decoder 704 returns hard information, it may have been the result of hard-decoding or soft-decoding. For a coded system, decoder 704 may return coded information or decoded information.

Figure 8:
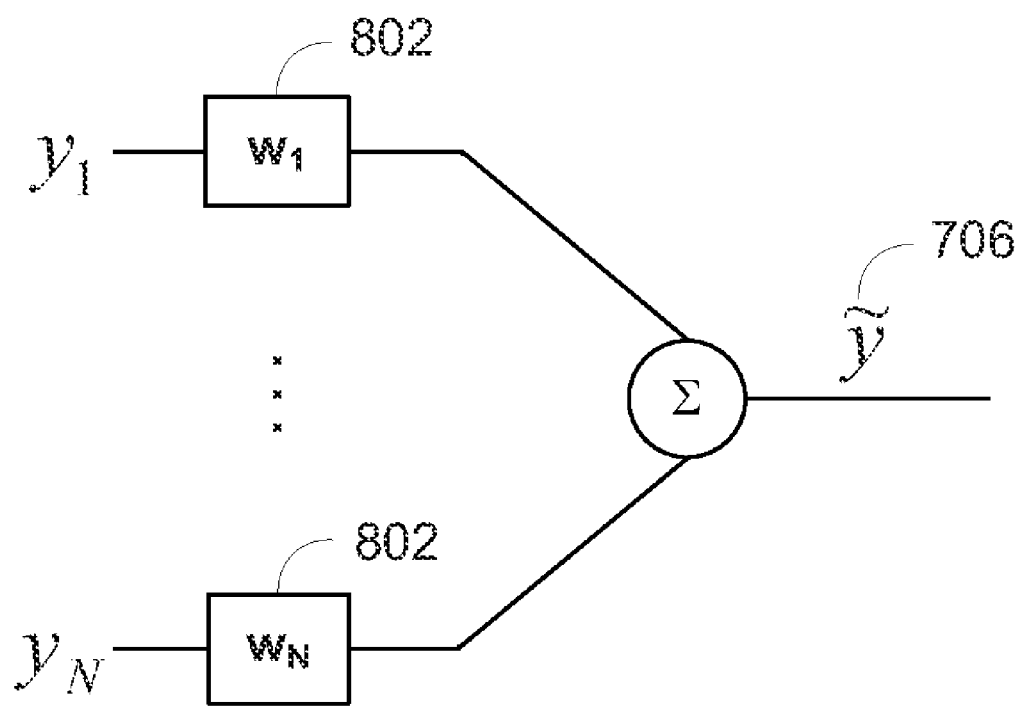
FIG. 8 is one embodiment of the combiner in FIG. 7 for a single input, single output (SISO) system.

For single input, single output (SISO) systems, where $N_t=N_r=1$, one way to implement the combiner of FIG. 7 is shown in FIG. 8. The received symbols, $y_1, \ldots, y_N$, are combined by taking a weighted sum of the symbols. Weights 802 for the received symbols are conventionally chosen to maximize the signal-to-noise ratio (SNR), a technique called maximal ratio combining (MRC). MRC with ML decoding is a preferred method for decoding multiple received signals in the presence of AWGN. Either hard-decoding or soft-decoding may be performed, depending on the situation (e.g. uncoded system, coded system, etc.).

Figure 9:
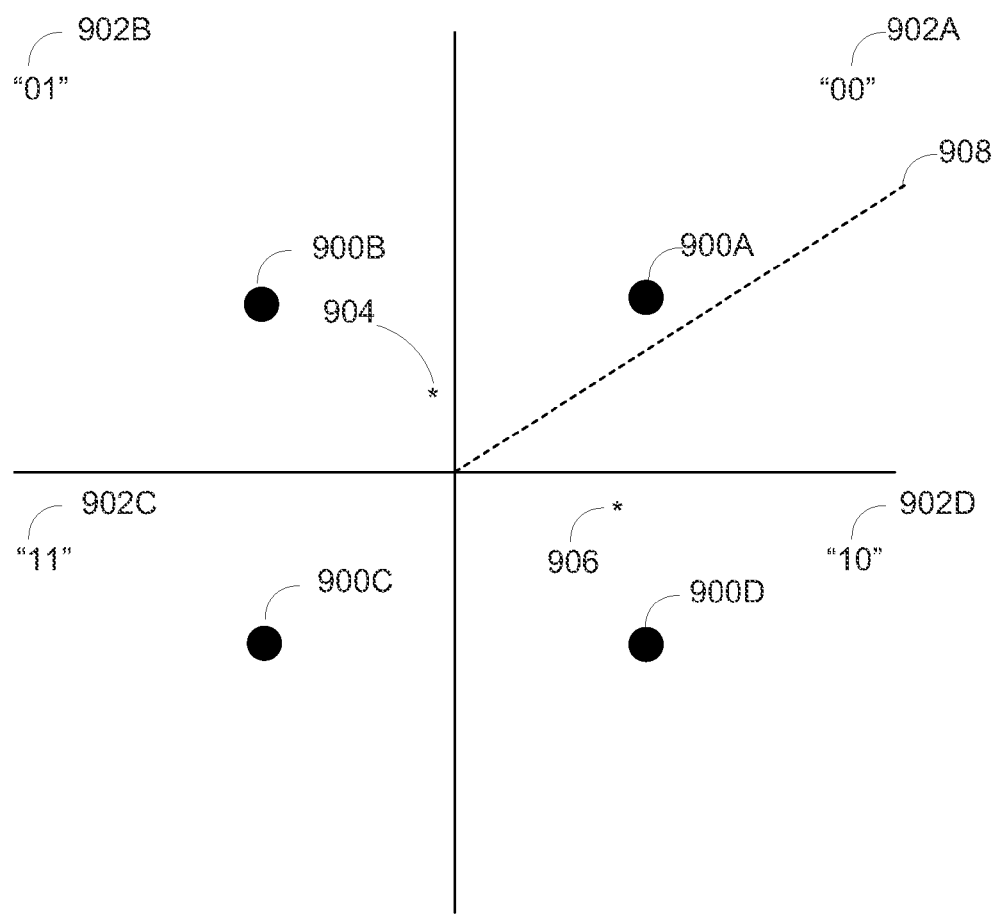
FIG. 9 is a diagram illustrating an example of symbol-level combining using weighted addition.

FIG. 9 shows an example of MRC, or any other weighted addition combining, for a SISO system. The signal constellation set is 4-QAM, which was previously described in connection with FIG. 4A. Signal points 900A-900D represent the magnitude and phase of the transmitted symbol. For illustration purposes, assume that the transmitter is sending the symbol, "00" (900A) to the receiver using a HARQ type-I protocol. Assume, for the purpose of illustration, that the channel does not attenuate, amplify, or alter the signal in any way. Therefore, ideally, the magnitude and phase of a received signal is the same as the transmitted signal. If, due to additive noise, 904 is actually received, it will be incorrectly decoded as "01," because it is closer to signal point 900B than 900A. Note that an ML decoder will make this decision if the noise is AWGN. The error-detecting code may then detect the presence of the bit error, resulting in a request for a retransmission. On the second transmission, 906 is received. If 906 is decoded on its own, it will be incorrectly decoded as "10." However, by weighted addition, the resulting combined symbol falls approximately on dotted line 908. The combined symbol is now closest to signal point 900A and will be decoded correctly as "00." The above example shows how error correction can be performed by combining vectors that, decoded individually, have errors. Thus, using a symbol-level combining scheme may also result in fewer retransmissions in a HARQ type-I protocol.

Note that HARQ type-II and HARQ type-III are not applicable to symbol-level combining, as described above. The symbols being transmitted are not always the same in successive transmissions, because HARQ type-II and HARQ type-III utilize incremental redundancy and therefore change the bit stream being transmitted.

The extension from SISO to general MIMO systems for decoding multiple received vectors for the same transmit vector is not straightforward. Thus, the present invention discloses a different form of symbol-level combining, called Concatenation-Assisted Symbol-Level (CASL) combining, that is extendable to MIMO systems.

Figure 10:
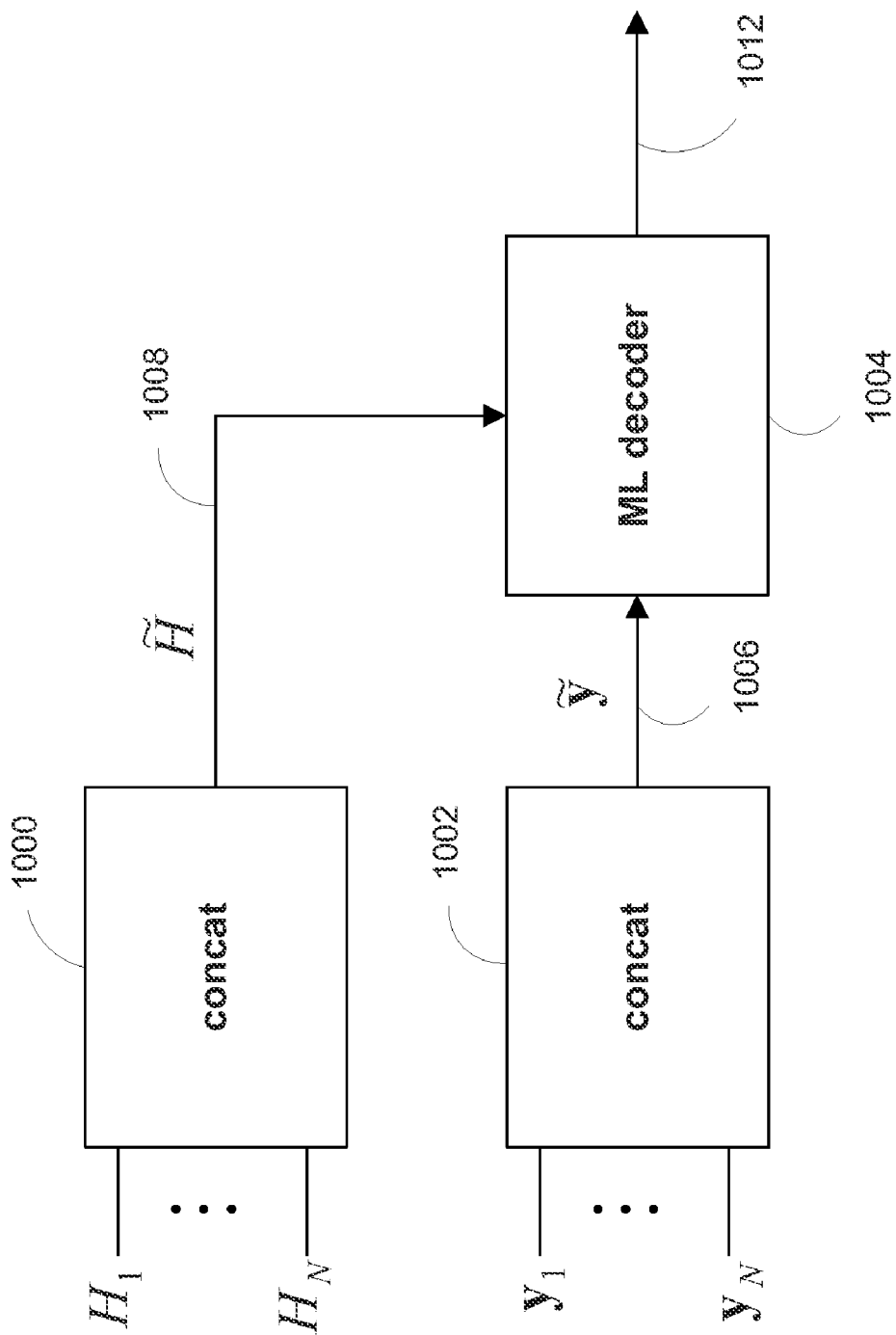
FIG. 10 is one embodiment of FIG. 7 for a multiple-input multiple-output system using concatenation-assisted symbol-level combining and maximum-likelihood decoding.

FIG. 10 shows a simplified diagram of a CASL Combining decoder using maximum-likelihood decoding in accordance with one embodiment of the invention. Combiner 1002 concatenates each of the received vectors into a single, $NN_r$-dimensional vector $\tilde{y}$ 1006. The combined vector 1006 is then decoded using ML decoder 1004, which uses concatenated matrix 1008 from combiner 1000. Based on the received vector, an ML decoder for a MIMO system, such as decoder 1004, picks a valid transmit vector that has the highest probability of being sent. Mathematically, this corresponds to choosing the transmit vector that maximizes equation (2). Equivalently, for an AWGN channel, an ML decoder picks the values of a valid transmit signal vector x that minimizes the magnitude of the noise. Thus, the metric implemented by decoder 1004 is $\|\tilde{y}-\tilde{H}x\|^2$. For a coded system, an ML decoder may also decode the received vector by choosing the most likely codeword that was sent, and obtaining the corresponding message.

Figure 11A:
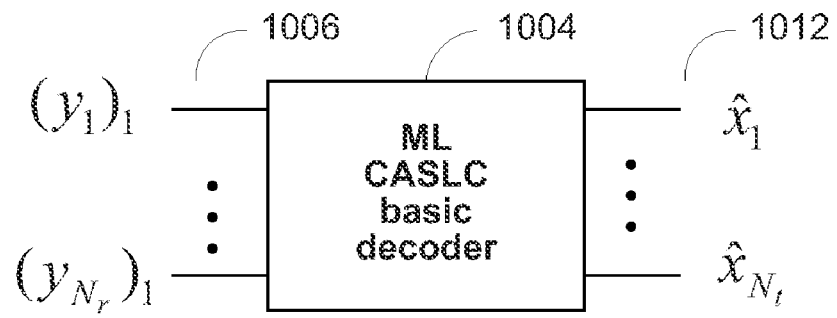
FIG. 11A is diagram illustrating the input/output relationship for the maximum-likelihood decoder of FIG. 10 when one signal vector is received.

When the system of FIG. 10 has received only one instance of x, where $$y_1 = H_1 x + n_1, \quad (3)$$

the concatenation steps performed by combiners 1002 and 1000 are trivial. Vector 1006 is simply $y_1$, and vector 1008 is simply $H_1$. The ML decoder 1004 may estimate the $N_t \times 1$ common transmitted signal vector 104 from the $N_r \times 1$ signal vector 1006. For clarity, the input/output relationship of the decoder when only one signal vector has been received is shown in FIG. 11A.

When the system of FIG. 10 has received N signal vectors ($N \geq 2$), the channel matrices and received signal vectors are combined by combiners 1000 and 1002, yielding combined signal vector 1006 and combined channel matrix 1008. For system modeling purposes, the noise vectors are also concatenated. Thus, the combined vectors are $$\tilde{y} = [y_1^T y_2^T \ldots y_N^T]^T \quad (4)$$

$$\tilde{n} = [n_1^T n_2^T \ldots n_N^T]^T \quad (5)$$

$$\tilde{H} = [H_1^T H_2^T \ldots H_N^T]^T, \quad (6)$$

Figure 12:
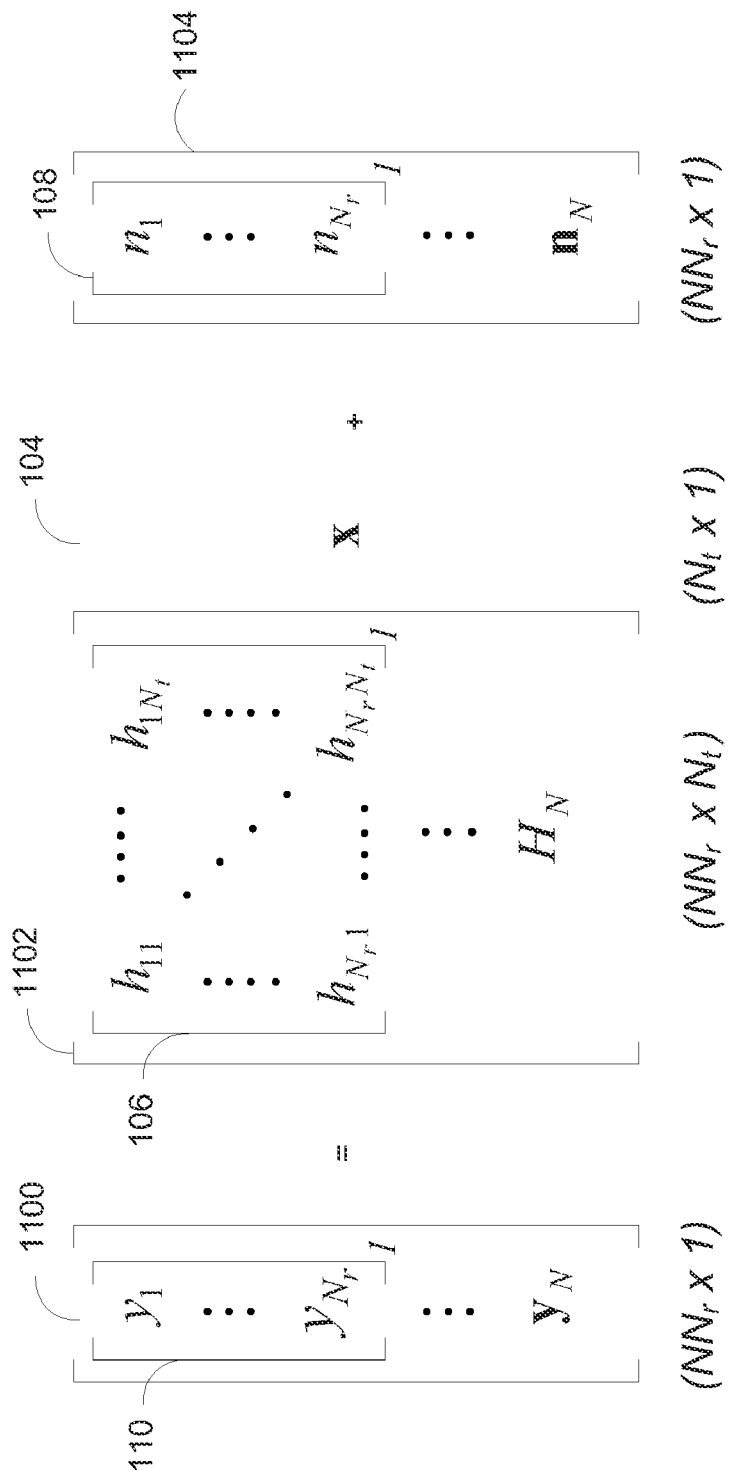
FIG. 12 is a vector model of the concatenated system of FIG. 10.

$\tilde{y}$ and $\tilde{n}$ are the $NN_r \times 1$ concatenated received signal vector and concatenated noise vector, respectively, and $\tilde{H}$ is the $NN_r \times N_t$ concatenated channel matrix. After concatenation, the new channel model for the system is shown in equation (8). For clarity, FIG. 12 shows each component of the vectors and matrix in equation (8). Note that equations (7) and (8) are equivalent, since there is no loss of information in concatenation. Therefore, if an optimal decoder is used, the system has optimal performance.

$$y_i = H_i x + n_i, \; i=1, \ldots, N. \tag{7}$$

$$\tilde{y} = \tilde{H} x + \tilde{n}. \tag{8}$$

Following concatenation, decoder 1004 estimates the transmitted signal from the $NN_r \times 1$ signal vector $\tilde{y}$ 706 using the ML metric, $\|\tilde{y} - \tilde{H} x\|^2$, as previously defined. For clarity, the input/output relationship of a decoder with N received vectors is shown in FIG. 11B.

Figure 11B:
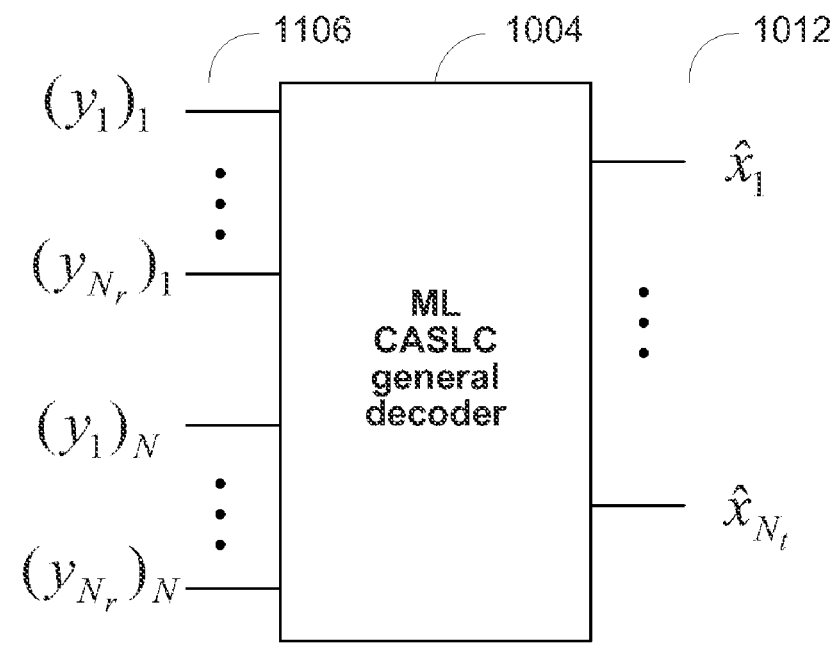
FIG. 11B is a diagram illustrating the input/output relationship for the maximum-likelihood decoder of FIG. 11 when N signal vectors are received.

FIG. 11B shows that the number of inputs into decoder 1004 varies with the number of received vectors. Therefore, to implement the block diagram of FIG. 10, decoder 1004 may need to include separate decoders for each possible N. However, using a separate decoder for each N would drastically increase both the amount and complexity of the hardware. In addition, since it would be impractical and impossible to implement a different decoder for all $N \geq 1$, the decoding flexibility of the receiver would be limited.

Figure 13:
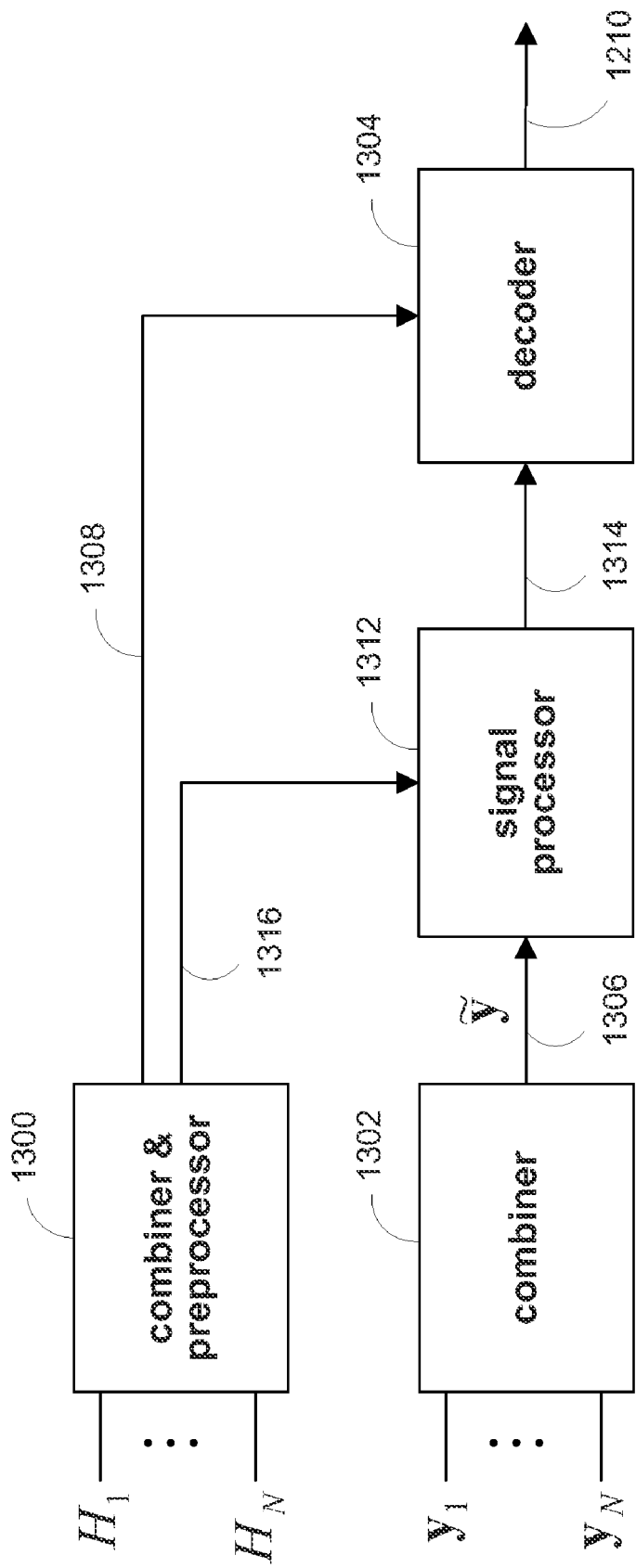
FIG. 13 is a block diagram of a receiver that combines incoming vectors, processes the combined vector, and decodes the vector.

Therefore, FIG. 13 is a block diagram of a simplified implementation of receiver 112 in accordance with one embodiment of the present invention. FIG. 13 differs from FIG. 7 for at least the reason that FIG. 13 has signal processor 1314 between combiner 1302 and decoder 1304. With proper design of signal processor 1312, a single decoder may be implemented for all N. In particular, the signal processing techniques enable decoder 1304 to implement only the decoder for N=1, when no combining is necessary. The decoder used for N=1 is hereafter called a basic decoder, and the decoder used for any integer N>1 is hereafter referred to as a general decoder.

Two detailed embodiments of FIG. 13 are disclosed below to illustrate the use of signal processing to enable reuse of the basic decoder. One embodiment uses an equalizer based on QR decomposition of the channel matrix prior to maximum-likelihood decoding. The other embodiment utilizes zero-forcing (ZF) equalization, followed by a simple, linear decoder. This simple decoder will be referred to as a zero-forcing decoder. Maximum-likelihood decoding and zero-forcing equalization and decoding represent two strategies that may be used in the present invention. The present invention, however, is not limited to any particular type of signal processing or decoding. For example, a minimum mean squared error (MMSE) equalizer/decoder may also be used. As shown below for ML and ZF, each of these decoding strategies implements potentially different signal processing in order to enable reuse of the basic decoder. To show that the decoder is capable of reuse for all N, the basic decoder for each of the following systems is described first. Then, the general decoder is described and shown to be the same as the basic decoder.

Figure 14:
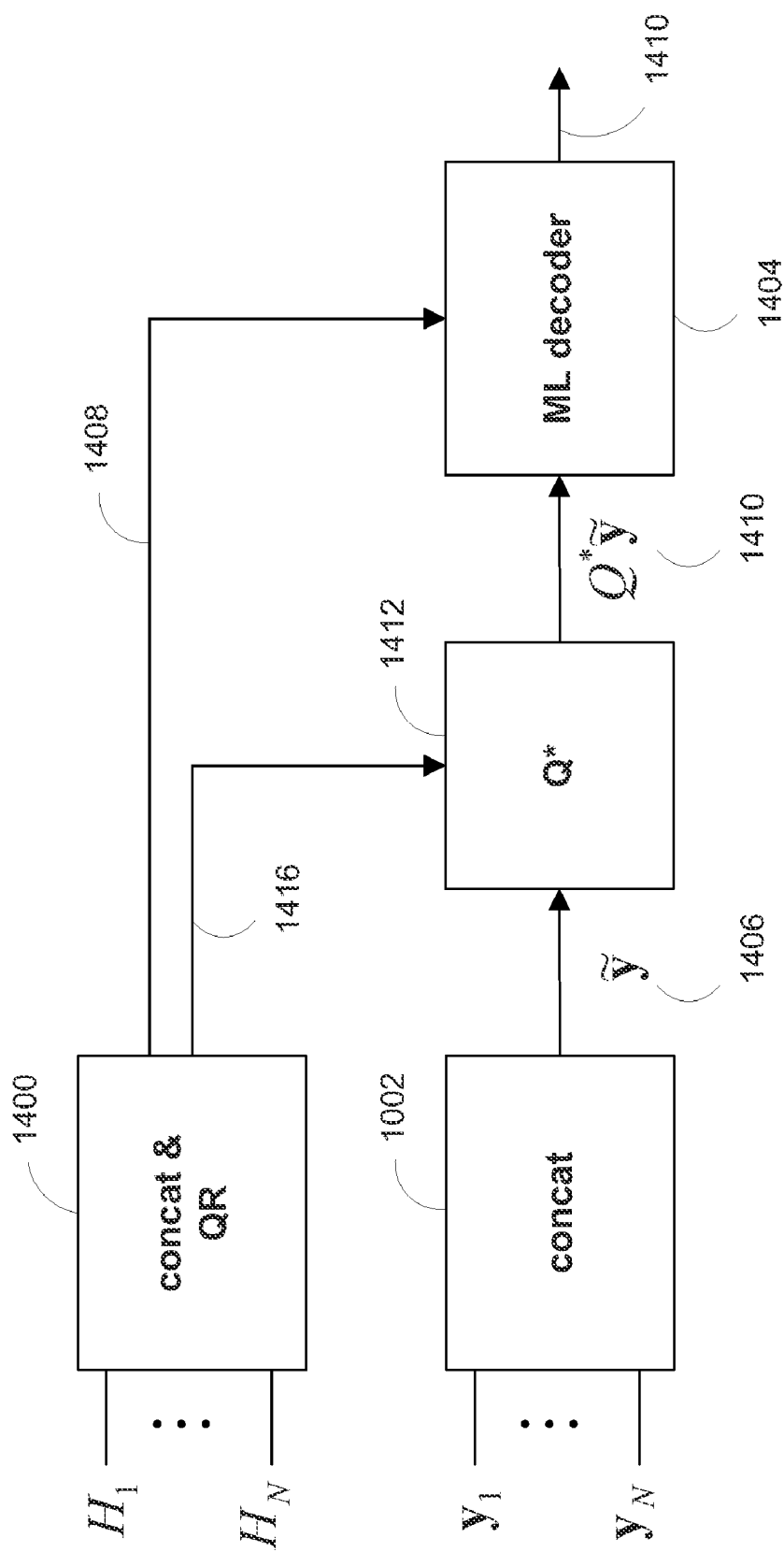
FIG. 14 is one embodiment of FIG. 13, where the receiver performs QR decomposition of the combined channel matrix and maximum-likelihood decoding.

FIG. 14 is a block diagram for ML decoding of processed received signals. The channel matrix is first concatenated and preprocessed by combiner/preprocessor 1400. In this case, pre-processing involves factoring the combined channel matrix into a matrix with orthonormal columns, Q, and a square, upper-triangular matrix R. Matrices Q and R are used by signal processor 1412 and decoder 1404. The advantage of applying QR factorization to the channel matrix will become apparent below.

When only one signal vector has been received by the system in FIG. 14, concatenation by combiners 1400 and 1402 is trivial. The received signal can be represented as $$y_1 = H_1 x + n_1 \tag{9}$$
$$= Q_1 R_1 x + n_1. \tag{10}$$

Using the channel information provided by combiner/preprocessor 1400, signal processor 1412 multiplies the received vector by $Q_1^*$, where $Q_1^*$ is the transpose of $Q_1$, yielding $$Q_1^* y_1 = Q_1^* Q_1 R_1 x + Q_1^* n_1 \tag{11}$$
$$= R_1 x + Q_1^* n_1 \tag{12}$$

Equation (12) follows from equation (11) because $Q_1^* Q_1 = I_{Nt}$, where $I_{Nt}$ is the $N_t \times N_t$ identity matrix, when $Q_1$ has orthonormal columns.

Since only one vector is received by the receiver in FIG. 14, decoder 1404 is a basic decoder. Using the $N_t \times 1$ signal vector $Q_1^* y_1$, basic decoder 1404 estimates the $N_t \times 1$ common transmitted vector x. Decoder 1404 may still implement the same decoding scheme as basic decoder 1004, except decoder 1404 picks a valid transmit signal vector x that minimizes $Q_1^* n_1$. The decoder metric, therefore, is $\|Q_1^* y_1 - R_1 x\|^2$.

When multiple signal vectors (N>1) have been received by the system in FIG. 14, the N channel matrices and N received vectors are concatenated at 1400 and 1402, respectively. The concatenation operation is shown in equations (4) and (6) for the channel matrices and received vectors, respectively. Equation (6) is reproduced in equation (13) for convenience. In addition to concatenation, combiner/preprocessor 1400 performs QR decomposition on the combined channel matrix. That is, it determines the values of $\tilde{Q}$ and $\tilde{R}$ in $$\tilde{H} = [H_1^T H_2^T \ldots H_N^T]^T \tag{13}$$
$$= \tilde{Q} \tilde{R}, \tag{14}$$

where $\tilde{Q}$ is an $NN_r \times N_t$ matrix with orthonormal columns, and $\tilde{R}$ is an $N_t \times N_t$ upper triangular matrix. Accordingly, concatenated received signal vector 1406 can be represented as $$\tilde{y} = \tilde{H} x + \tilde{n} \tag{15}$$
$$= \tilde{Q} \tilde{R} x + \tilde{n}, \tag{16}$$

where $\tilde{Q}$ and $\tilde{R}$ are defined in equation (14) and $\tilde{n}$ is a noise vector defined in equation (5). Following concatenation, signal processor 1412 multiplies concatenated received vector 1406 by $\tilde{Q}^*$, yielding $$\tilde{Q}^* \tilde{y} = \tilde{Q}^* \tilde{Q} \tilde{R} x + \tilde{Q}^* \tilde{n} \tag{17}$$
$$= \tilde{R} x + \tilde{Q}^* \tilde{n} \tag{18}$$

Since multiple vectors have been received by the receiver in FIG. 14, ML decoder 1404 is a general decoder. Similar to the basic decoding case, general ML decoder 1404 picks the vector x that minimizes the metric, $\|\tilde{Q}^* \tilde{y} - \tilde{R} x\|^2$.

There is no loss of information from the operation performed by equalizer 1412, namely multiplying equation (16) by $\tilde{Q}^*$. This is because the $N_t$ columns of $\tilde{Q}$, which span the same space as the columns of $\tilde{H}$, can be thought of as an $NN_r$ dimensional orthonormal basis for the $N_t$ dimensional subspace where the transmitted signal lies. By multiplication of $\tilde{Q}^*$, the dimension of the signal and noise vectors are reduced from $NN_r$ to $N_t$. The dimension of the transmitted signal vector was originally $N_t$, so there is no loss of information from the multiplication by $\tilde{Q}^*$. Furthermore, the noise parts lying in the reduced dimension do not affect the decoding process. Therefore, since FIG. 14 uses an optimal, ML decoder, the system has optimal performance.

Because of the multiplication by $\tilde{Q}^*$, which is performed by signal processor 1412, the size of the signal processor output, vector 1414 or $\tilde{Q}^*\tilde{y}$, is reduced to $N_t$. This is the same dimension as when only one signal vector is received. Therefore, the dimension of the input to ML decoder 1404 for N>1 is the same as the dimension of the basic decoder, which enables the same decoder to be used for arbitrary N. Thus, by processing the combined signal with $\tilde{Q}^*$ prior to decoding, the complexity of decoder 1404 may be drastically reduced.

Figure 15:
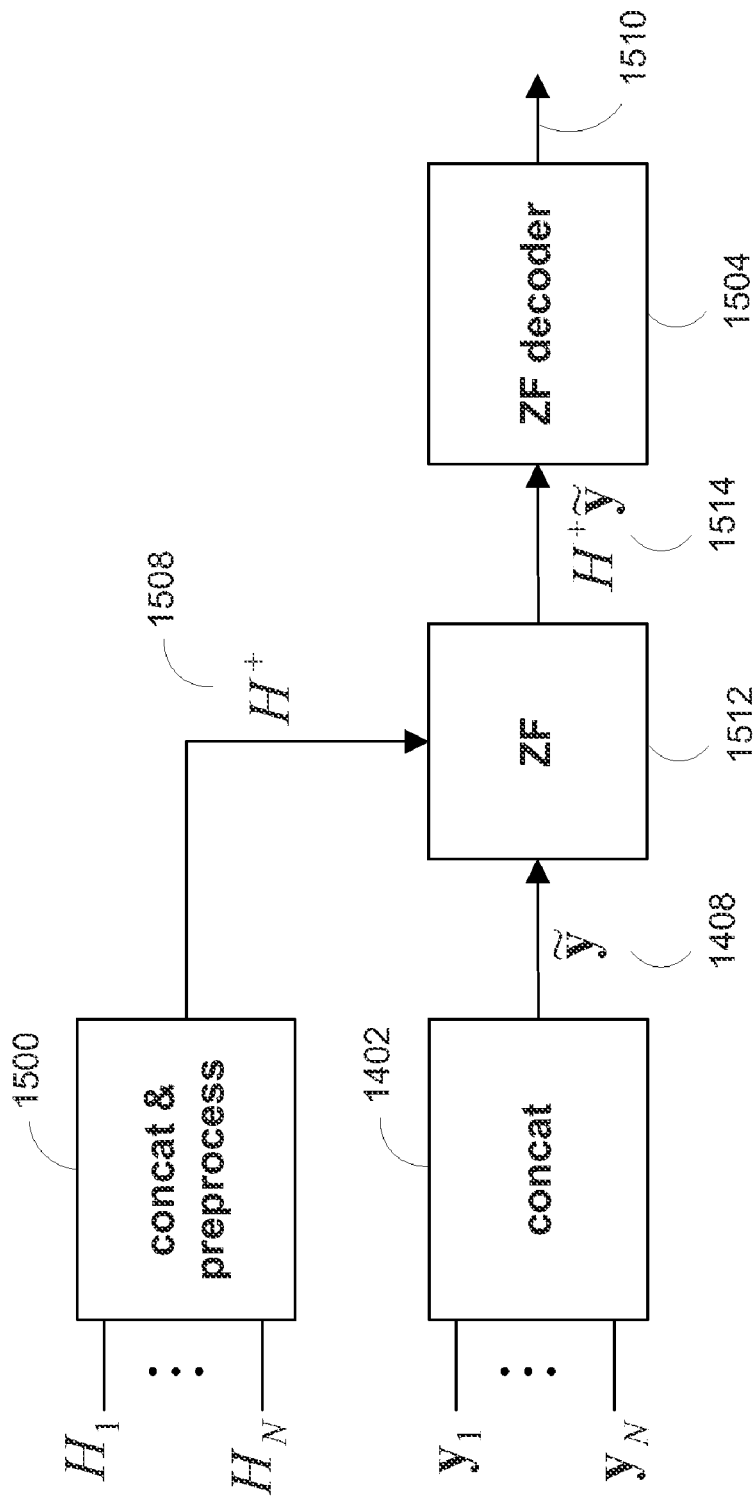
FIG. 15 is one embodiment of FIG. 14, where the receiver uses zero-forcing equalization and decoding.

A second embodiment of the block diagram in FIG. 13 is shown in FIG. 15. The block diagram in FIG. 15 uses zero-forcing (ZF) equalization and decoding. Zero-forcing is a technique used to ideally eliminate the effect of a channel, H, from a received vector, y, by multiplying the received vector by the channel inverse, $H^{-1}$. The result is generally a signal similar to the transmitted signal, but with correlated and amplified noise. Thus, a zero-forcing decoder is a non-optimal form of decoding. However, it is effective in many circumstances and has much lower complexity than ML decoding.

When only one signal vector has been received by the system in FIG. 15, concatenation by combiner 1402 is trivial, and signal vector 1408 is simply $y_1$, where $$y_1 = H_1 x + n_1. \quad (19)$$

Concatenation by combiner/preprocessor 1500 is also trivial. However, combiner/preprocessor 1500 also preprocesses channel matrix 1508, which is simply $H_1$ in this case, to supply appropriate information to signal processor 1512. In particular, it determines the inverse of the channel matrix, $H_1^{-1}$. Signal processor 1512 uses the inverse to perform zero-forcing equalization on vector 1408. It multiplies vector 1408 by $H_1^{-1}$, yielding $$H_1^{-1} y_1 = H_1^{-1} H_1 x + H_1^{-1} n_1 \quad (20)$$
$$= x + H_1^{-1} n_1. \quad (21)$$

Note from equation (21) that equalizer 1512 produces the transmitted signal, x, with additive, potentially correlated noise.

Since only one signal vector is received by FIG. 15, ZF decoder 1504 is a basic decoder. Using $H^{-1} y_1$ and ignoring the correlation between the noise components, basic ZF decoder 1504 may try to estimate the $N_t \times 1$ common transmitted signal vector, x.

One valuable aspect of the zero-forcing technique employed by the system in FIG. 15 comes from the fact that each component of 1514 may be decoded separately. For an ML decoding scheme, such as the one shown in FIG. 14, the decoder has to consider the transmitted vector as a whole in order to calculate $\|\tilde{y} - \tilde{H}x\|^2$. Instead, to estimate the $k^{th}$ component of x, decoder 1510 implements a method to calculate the metric, $$\frac{\left| [H_1^{-1} y_1]_k - [x]_k \right|^2}{[H_1^{-1} H_1^{-1*}]_{k,k}}, \quad (24)$$

The subscript k indexes the kth element of a vector, and the subscript k,k indexes the $(k,k)^{th}$ element of a matrix. Since x has a dimension of $N_t$, k takes on the values $1, \ldots, N_t$, and the metric is implemented for each of the $N_t$ signals.

Now considering the case with N received signal vectors ($N \geq 2$), the channel model can again be expressed as $$\tilde{y} = \tilde{H} x + \tilde{n}, \quad (25)$$

where the components of equation (25) are shown more clearly in FIG. 12. $\tilde{y}$ is obtained by the system in FIG. 15 by combiner 1402 and $\tilde{H}$ is obtained by combiner/preprocessor 1500. In addition, combiner/preprocessor 1500 preprocesses $\tilde{H}$ to supply appropriate information to zero-forcing equalizer 1512. In particular, it calculates the pseudo-inverse of $\tilde{H}$, $\tilde{H}^\dagger$, where $\tilde{H}^\dagger = (\tilde{H}^* \tilde{H})^{-1} \tilde{H}^*$.

The zero-forcing equalizer 1512 attempts to recover the transmitted signal vector by multiplying the received vector in equation (25) by the pseudo-inverse, $\tilde{H}^\dagger$. The result of the equalizer is $$\tilde{H}^\dagger \tilde{y} = \tilde{H}^\dagger \tilde{H} x + \tilde{H}^\dagger \tilde{n} \quad (26)$$
$$= x + \tilde{H}^\dagger \tilde{n}. \quad (27)$$

Note from equation (27) that equalizer 1512 produces the transmitted signal, x, with additive, potentially correlated noise.

Since the receiver of FIG. 15 has multiple received vectors, zero-forcing decoder 1504 is a general decoder. The general ZF decoder estimates the $N_t \times 1$ transmitted signal vector, x, from the $N_t \times 1$ signal vector $\tilde{H}^\dagger \tilde{y}$ and ignoring the correlation between the noise components. Similar to the basic decoding case, to estimate the kth component of x, the decoder implements a method to calculate the metric, $$\frac{\left| [\tilde{H}^\dagger \tilde{y}]_k - [x]_k \right|^2}{[\tilde{H}^\dagger \tilde{H}^{\dagger*}]_{k,k}}, \quad (29)$$

The subscript k indexes the $k^{th}$ element of a vector, and the subscript k,k indexes the $(k,k)^{th}$ element of a matrix. Since x has a dimension of $N_t$, k takes on the values $1, \ldots, N_t$, and the metric is implemented for each of the $N_t$ signals.

Because of the multiplication by $\tilde{H}^\dagger$ performed by signal processor 1512, the size of the signal processor output, vector 1514 or $\tilde{H}^\dagger \tilde{y}$, is reduced to $N_t$. This is the same dimension as when only one signal vector is received. Therefore, the dimension of the input to ML decoder 1504 for N>1 is the same as the dimension of the basic decoder, which enables the same decoder to be used for arbitrary N. Thus, by processing the combined signal with $\tilde{H}^\dagger$ prior to decoding, the complexity of the decoder 1504 may be drastically reduced.

Similar to the ML case above, QR decomposition may also be performed on the channel matrix in the zero-forcing case to reduce computation complexity. Before combiner/preprocessor 1500 computes the pseudo-inverse of the combined channel matrix, it factors the matrix, $\tilde{H}$, into a matrix with orthonormal columns, $\tilde{Q}$, and a square, upper-triangular matrix $\tilde{R}$:

$$\tilde{H} = [H_1^T H_2^T \ldots H_N^T]^T \quad (30)$$

$$= \tilde{Q}\tilde{R}, \quad (31)$$

Following QR decomposition, combiner/preprocessor 1500 calculates the inverse of $\tilde{Q}\tilde{R}$, which is $\tilde{R}^{-1}\tilde{Q}^*$.

Signal processor uses the inverse to perform zero-forcing equalization on vector 1408. It multiplies vector 1408 by $\tilde{R}^{-1}\tilde{Q}^*$, yielding $$\tilde{R}^{-1}\tilde{Q}^* \tilde{y} = \tilde{R}^{-1}\tilde{Q}^* \tilde{Q}\tilde{R}x + \tilde{R}^{-1}\tilde{Q}^* \tilde{n} \quad (32)$$

$$= x + \tilde{R}^{-1}\tilde{Q}^* \tilde{n} \quad (33)$$

Accordingly, the metric implemented by decoder 1504 becomes $$\frac{\left| [\tilde{R}^{-1}\tilde{Q}^* \tilde{y}]_k - [x]_k \right|^2}{[\tilde{R}^{-1}\tilde{R}^{-*}]_{k,k}} \quad (34)$$

The subscript k indexes the $k^{th}$ element of a vector, and the subscript k,k indexes the $(k,k)^{th}$ element of a matrix. Since x has a dimension of $N_t$, k takes on the values $1, \ldots, N_t$, and the metric is implemented for each of the $N_t$ signals.

The above embodiments described in connection with FIGS. 7, 10, and 13-15 may concatenate all received signal vectors and channel matrices. Alternatively, a subset of the received signal vectors and channel matrices may be combined. For example, a received signal and the corresponding channel matrix may be discarded if the magnitude of a component in the received signal vector is below a certain threshold.

Referring now to FIGS. 16A-16G, various exemplary implementations of the present invention are shown.

Figure 16A:
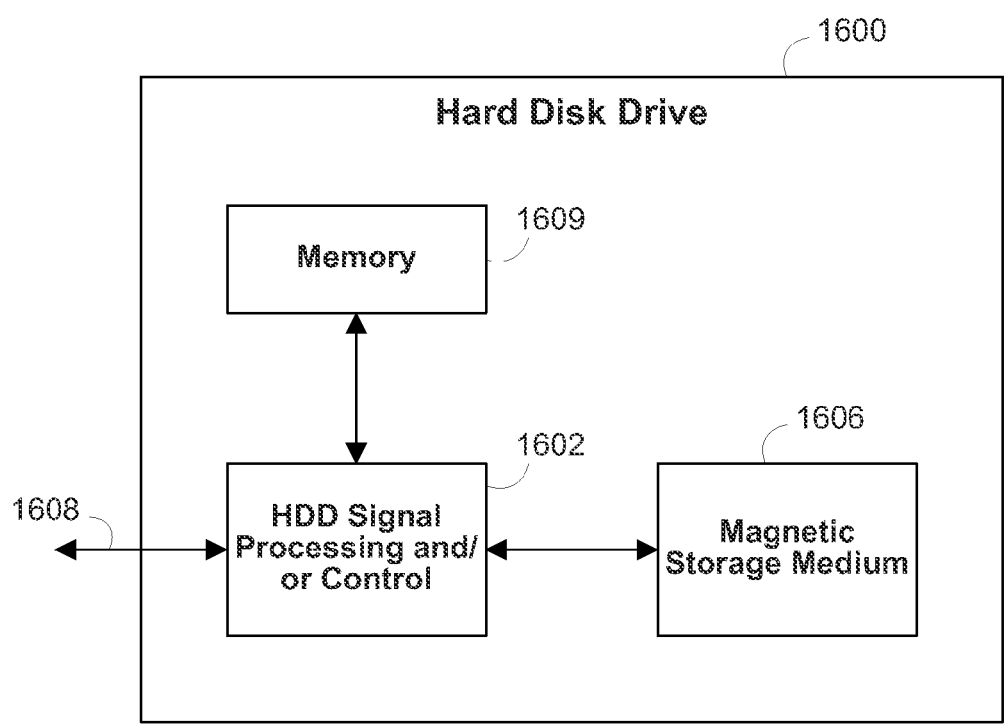
FIG. 16A is a block diagram of an exemplary hard disk drive that can employ the disclosed technology.

Referring now to FIG. 16A, the present invention can be implemented in a hard disk drive 1600. The present invention may implement either or both signal processing and/or control circuits, which are generally identified in FIG. 16A at 1602. In some implementations, the signal processing and/or control circuit 1602 and/or other circuits (not shown) in the HDD 1600 may process data, perform coding and/or encryption, perform calculations, and/or format data that is output to and/or received from a magnetic storage medium 1606.

The HDD 1600 may communicate with a host device (not shown) such as a computer, mobile computing devices such as personal digital assistants, cellular phones, media or MP3 players and the like, and/or other devices via one or more wired or wireless communication links 1608. The HDD 1600 may be connected to memory 1609 such as random access memory (RAM), low latency nonvolatile memory such as flash memory, read only memory (ROM) and/or other suitable electronic data storage.

Figure 16B:
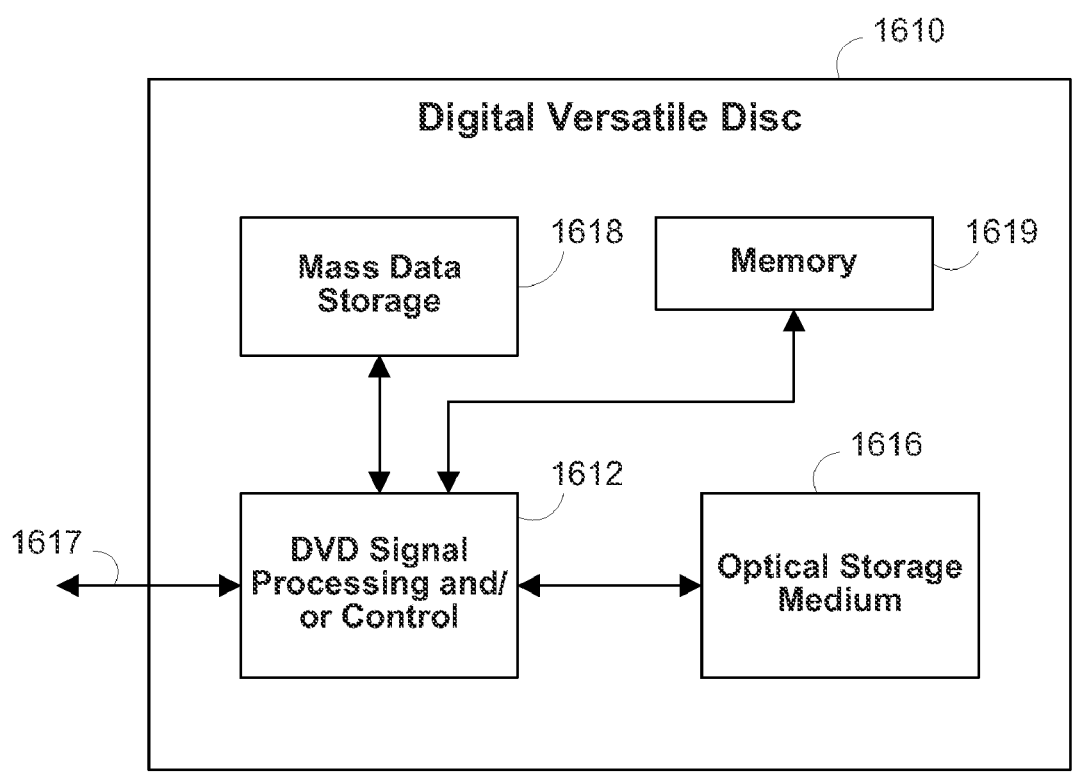
FIG. 16B is a block diagram of an exemplary digital versatile disc that can employ the disclosed technology.

Referring now to FIG. 16B, the present invention can be implemented in a digital versatile disc (DVD) drive 1610. The present invention may implement either or both signal processing and/or control circuits, which are generally identified in FIG. 16B at 1612, and/or mass data storage of the DVD drive 1610. The signal processing and/or control circuit 1612 and/or other circuits (not shown) in the DVD 1610 may process data, perform coding and/or encryption, perform calculations, and/or format data that is read from and/or data written to an optical storage medium 1616. In some implementations, the signal processing and/or control circuit 1612 and/or other circuits (not shown) in the DVD 1610 can also perform other functions such as encoding and/or decoding and/or any other signal processing functions associated with a DVD drive.

The DVD drive 1610 may communicate with an output device (not shown) such as a computer, television or other device via one or more wired or wireless communication links 1617. The DVD 1610 may communicate with mass data storage 1618 that stores data in a nonvolatile manner. The mass data storage 1618 may include a hard disk drive (HDD). The HDD may have the configuration shown in FIG. 16A. The HDD may be a mini HDD that includes one or more platters having a diameter that is smaller than approximately 1.8". The DVD 1610 may be connected to memory 1619 such as RAM, ROM, low latency nonvolatile memory such as flash memory and/or other suitable electronic data storage.

Figure 16C:
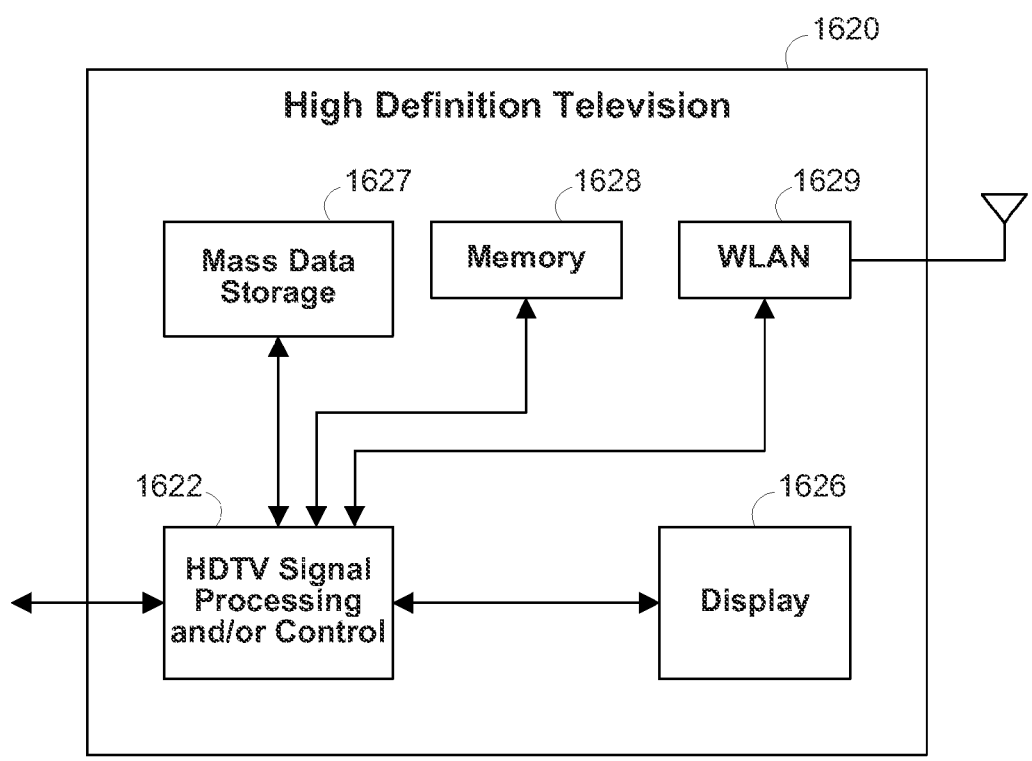
FIG. 16C is a block diagram of an exemplary high definition television that can employ the disclosed technology.

Referring now to FIG. 16C, the present invention can be implemented in a high definition television (HDTV) 1620. The present invention may implement either or both signal processing and/or control circuits, which are generally identified in FIG. 16C at 1622, a WLAN interface and/or mass data storage of the HDTV 1620. The HDTV 1620 receives HDTV input signals in either a wired or wireless format and generates HDTV output signals for a display 1626. In some implementations, signal processing circuit and/or control circuit 1622 and/or other circuits (not shown) of the HDTV 1620 may process data, perform coding and/or encryption, perform calculations, format data and/or perform any other type of HDTV processing that may be required.

The HDTV 1620 may communicate with mass data storage 1627 that stores data in a nonvolatile manner such as optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The HDTV 1620 may be connected to memory 1628 such as RAM, ROM, low latency nonvolatile memory such as flash memory and/or other suitable electronic data storage. The HDTV 1620 also may support connections with a WLAN via a WLAN network interface 1629.

Figure 16D:
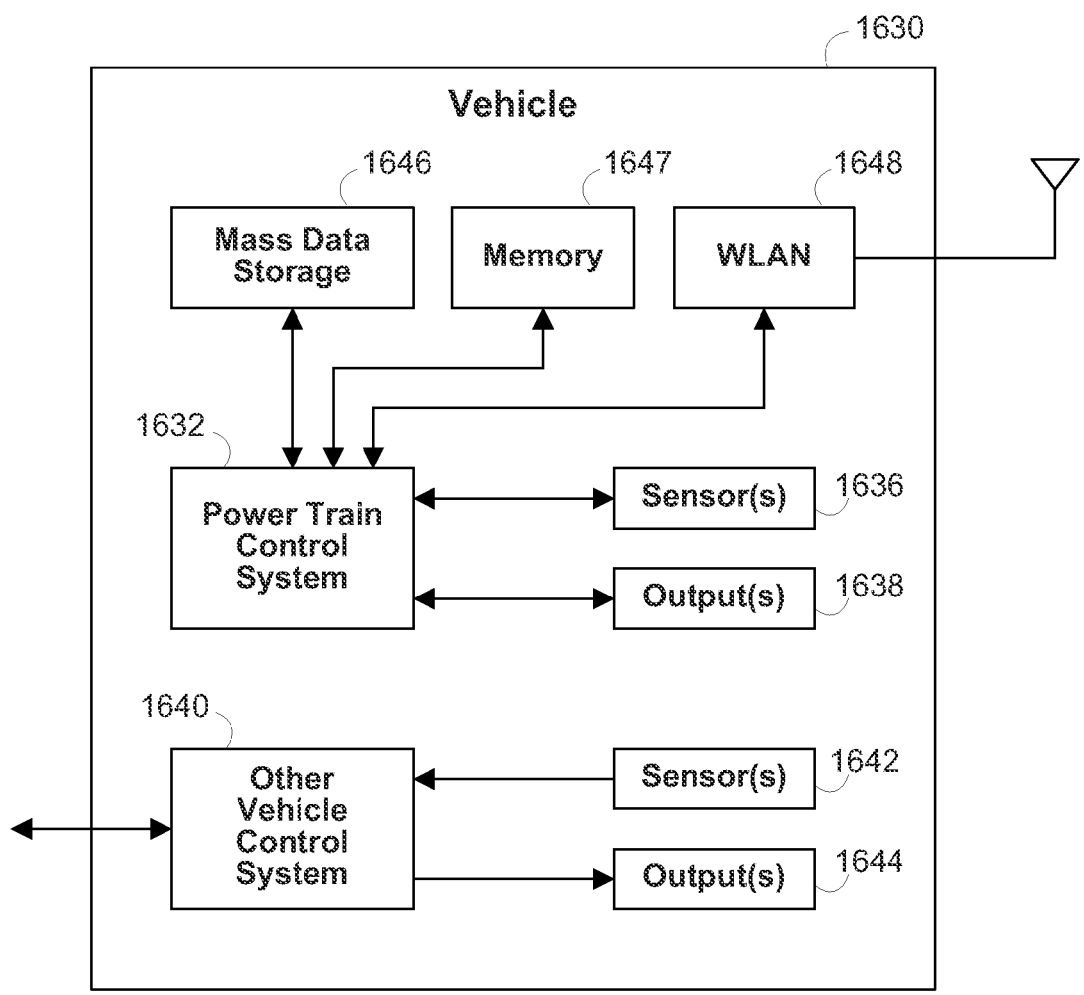
FIG. 16D is a block diagram of an exemplary vehicle that can employ the disclosed technology.

Referring now to FIG. 16D, the present invention implements a control system of a vehicle 1630, a WLAN interface and/or mass data storage of the vehicle control system. In some implementations, the present invention may implement a powertrain control system 1632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1640 of the vehicle 1630. The control system 1640 may likewise receive signals from input sensors 1642 and/or output control signals to one or more output devices 1644. In some implementations, the control system 1640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1632 may communicate with mass data storage 1646 that stores data in a nonvolatile manner. The mass data storage 1046 may include optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The powertrain control system 1632 may be connected to memory 1647 such as RAM, ROM, low latency nonvolatile memory such as flash memory and/or other suitable electronic data storage. The powertrain control system 1632 also may support connections with a WLAN via a WLAN network interface 1648. The control system 1640 may also include mass data storage, memory and/or a WLAN interface (all not shown).

Figure 16E:
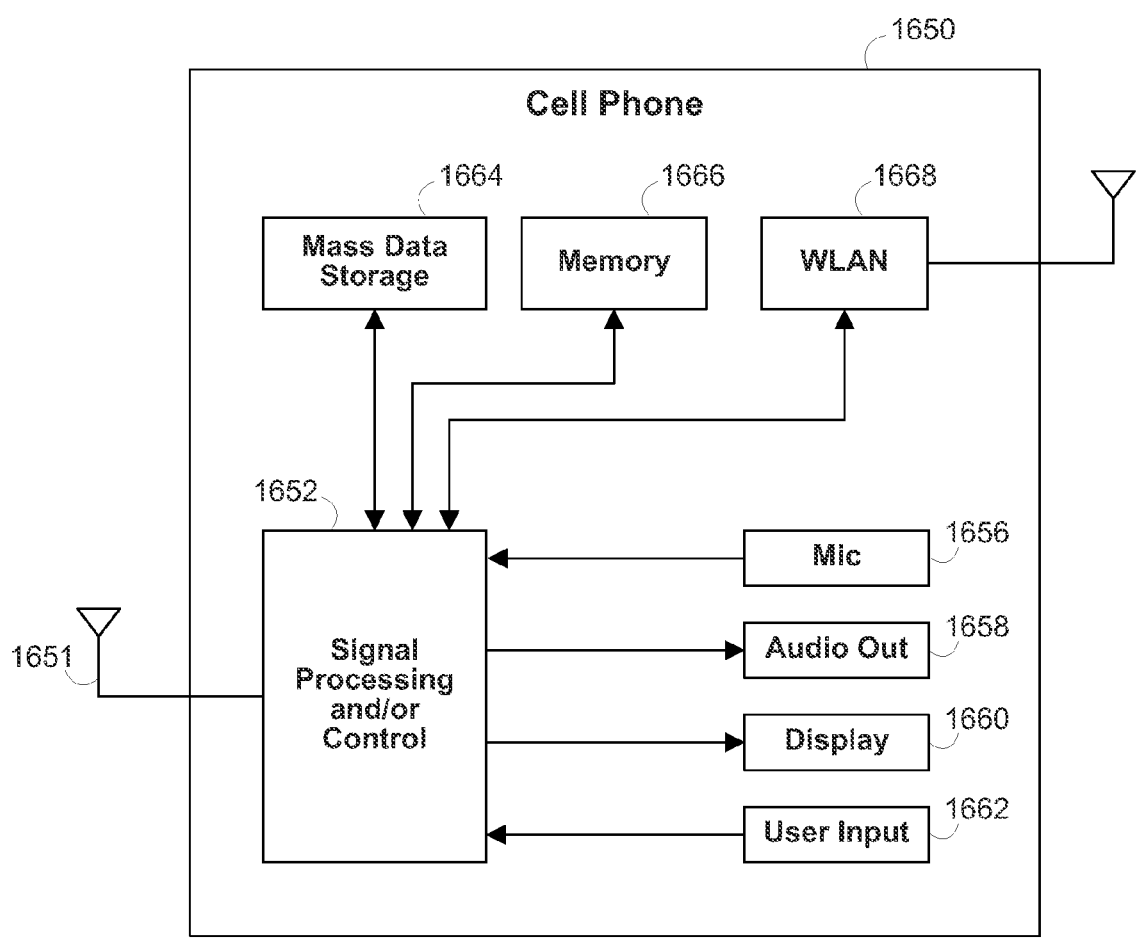
FIG. 16E is a block diagram of an exemplary cell phone that can employ the disclosed technology.

Referring now to FIG. 16E, the present invention can be implemented in a cellular phone 1650 that may include a cellular antenna 1651. The present invention may implement either or both signal processing and/or control circuits, which are generally identified in FIG. 16E at 1652, a WLAN interface and/or mass data storage of the cellular phone 1650. In some implementations, the cellular phone 1650 includes a microphone 1656, an audio output 1658 such as a speaker and/or audio output jack, a display 1660 and/or an input device 1662 such as a keypad, pointing device, voice actuation and/or other input device. The signal processing and/or control circuits 1652 and/or other circuits (not shown) in the cellular phone 1650 may process data, perform coding and/or encryption, perform calculations, format data and/or perform other cellular phone functions.

The cellular phone 1650 may communicate with mass data storage 1664 that stores data in a nonvolatile manner such as optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The cellular phone 1650 may be connected to memory 1666 such as RAM, ROM, low latency nonvolatile memory such as flash memory and/or other suitable electronic data storage. The cellular phone 1650 also may support connections with a WLAN via a WLAN network interface 1668.

Figure 16F:
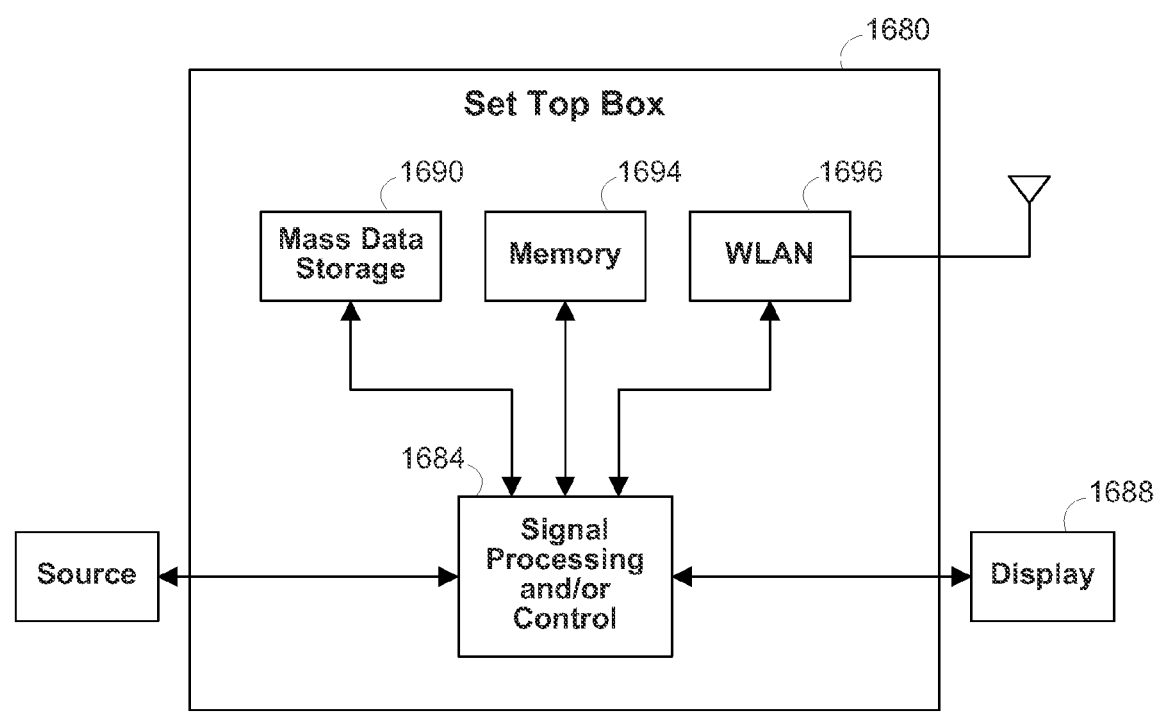
FIG. 16F is a block diagram of an exemplary set top box that can employ the disclosed technology.

Referring now to FIG. 16F, the present invention can be implemented in a set top box 1680. The present invention may implement either or both signal processing and/or control circuits, which are generally identified in FIG. 16F at 1684, a WLAN interface and/or mass data storage of the set top box 1680. The set top box 1680 receives signals from a source such as a broadband source and outputs standard and/or high definition audio/video signals suitable for a display 1688 such as a television and/or monitor and/or other video and/or audio output devices. The signal processing and/or control circuits 1684 and/or other circuits (not shown) of the set top box 1680 may process data, perform coding and/or encryption, perform calculations, format data and/or perform any other set top box function.

The set top box 1680 may communicate with mass data storage 1690 that stores data in a nonvolatile manner. The mass data storage 1690 may include optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The set top box 1680 may be connected to memory 1694 such as RAM, ROM, low latency nonvolatile memory such as flash memory and/or other suitable electronic data storage. The set top box 1680 also may support connections with a WLAN via a WLAN network interface 1696.

Figure 16G:
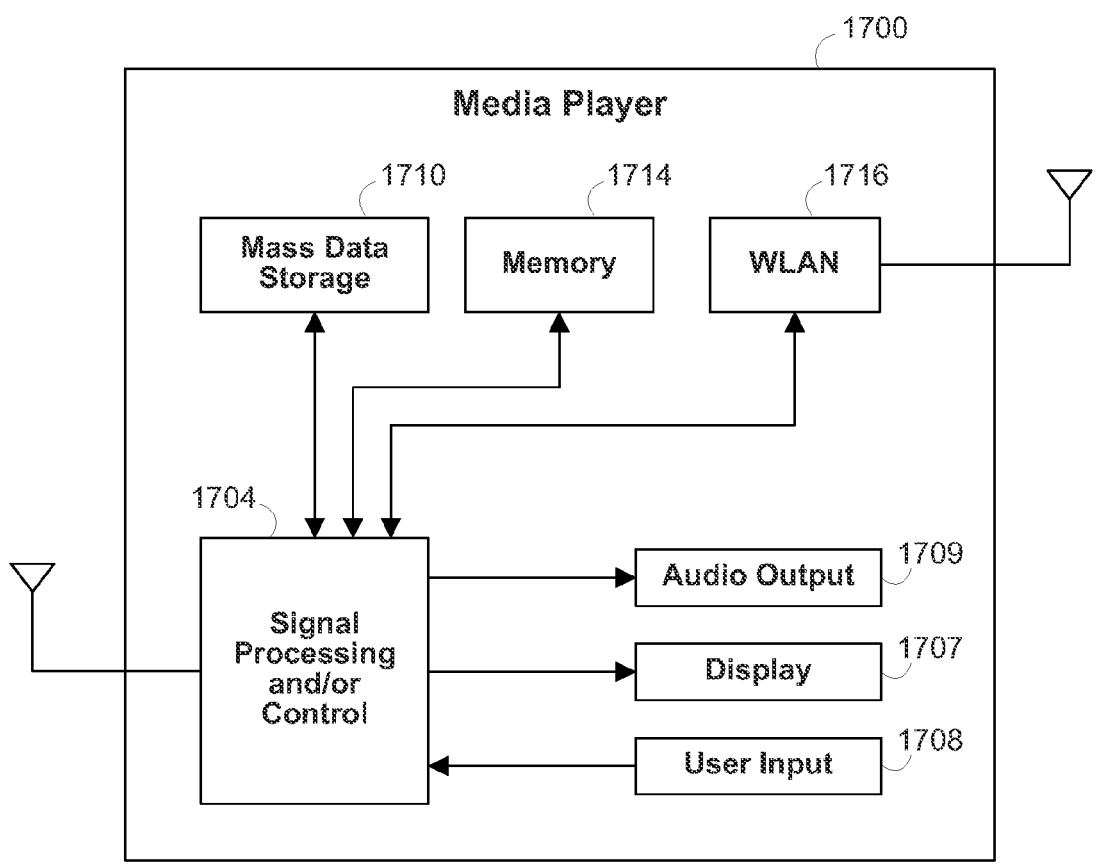
FIG. 16G is a block diagram of an exemplary media player that can employ the disclosed technology.

Referring now to FIG. 16G, the present invention can be implemented in a media player 1760. The present invention may implement either or both signal processing and/or control circuits, which are generally identified in FIG. 16G at 1704, a WLAN interface and/or mass data storage of the media player 1700. In some implementations, the media player 1700 includes a display 1707 and/or a user input 1708 such as a keypad, touchpad and the like. In some implementations, the media player 1700 may employ a graphical user interface (GUI) that typically employs menus, drop down menus, icons and/or a point-and-click interface via the display 1707 and/or user input 1708. The media player 1700 further includes an audio output 1709 such as a speaker and/or audio output jack. The signal processing and/or control circuits 1704 and/or other circuits (not shown) of the media player 1700 may process data, perform coding and/or encryption, perform calculations, format data and/or perform any other media player function.

The media player 1700 may communicate with mass data storage 1710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 16A and/or at least one DVD may have the configuration shown in FIG. 16B. The HDD may be a mini HDD that includes one or more platters having a diameter that is smaller than approximately 1.8". The media player 1700 may be connected to memory 1714 such as RAM, ROM, low latency nonvolatile memory such as flash memory and/or other suitable electronic data storage. The media player 1700 also may support connections with a WLAN via a WLAN network interface 1716. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method for decoding a signal vector in a multiple-input multiple-output transmission scheme, comprising:

receiving, with a receiver, multiple signal vectors of a first dimension ($N_r$) corresponding to a common transmit signal vector of a second dimension ($N_t$), wherein each of the received signal vectors is associated with a channel response matrix of dimension $N_r \times N_t$;

concatenating, with vector combining circuitry, K of the received signal vectors into a combined received signal vector of dimension $KN_r$, wherein K is an integer variable greater than one;

concatenating, with matrix combining circuitry, K of the channel response matrices into a combined channel response matrix of dimension $KN_r \times N_t$;

processing, with processing circuitry, the combined received signal vector to produce an equalized signal vector of dimension $N_t$, wherein $N_t<KN_r$; and decoding, with a decoder, the equalized signal vector using the combined channel response matrix.

2. The method of claim 1, wherein concatenating the received signal vectors comprises creating a vector, ỹ, where $$\tilde{y} = [y_1^T y_2^T \ldots y_N^T]^T$$

and $y_i$ is an ith received signal vector corresponding to the common transmit signal vector, and wherein concatenating the channel response matrices comprises creating a matrix, H̃, where $$\tilde{H} = [H_1^T H_2^T \ldots H_N^T]^T,$$

and $H_i$ corresponds to the channel response matrix for an ith transmission of the common transmit signal vector.

3. The method of claim 1, wherein processing the combined received signal vector comprises multiplying the combined received signal vector by $\tilde{H}^\dagger$, and wherein decoding the equalized signal vector comprises calculating a metric $$\frac{|[\tilde{H}^\dagger \tilde{y}]_k - [x]_k|^2}{[\tilde{H}^\dagger \tilde{H}^{\dagger *}]_{k,k}},$$

where $\tilde{H}^\dagger = (\tilde{H}^* \tilde{H})^{-1} \tilde{H}^*$, k indexes a kth component of a vector, and k,k indexes a $(k,k)^{th}$ component of a matrix.

4. The method of claim 1 further comprising calculating a matrix parameter from the combined channel response matrix, wherein the combined received signal vector is processed using the calculated matrix parameter to produce the equalized signal vector of dimension $N_t$, wherein $N_t<KN_r$.

5. The method of claim 4, wherein calculating the matrix parameter from the combined channel response matrix comprises performing QR decomposition on the combined channel response matrix, and wherein decoding the equalized signal vector comprises calculating a metric $$\frac{|[\tilde{R}^{-1} \tilde{Q}^* \tilde{y}]_k - [x]_k|^2}{[\tilde{R}^{-1} \tilde{R}^{-*}]_{k,k}},$$

where $\tilde{Q}$ and $\tilde{R}$ are resulting matrices from QR decomposition, $\tilde{Q}^*$ is a transpose of $\tilde{Q}$, k indexes a kth component of a vector, and k,k indexes a $(k,k)^{th}$ component of a matrix.

6. The method of claim 4, wherein calculating the matrix parameter from the combined channel response matrix comprises performing QR decomposition on the combined channel response matrix, and wherein decoding the equalized signal vector comprises calculating a metric $$\|\tilde{Q}^* \tilde{y} - \tilde{R} x\|^2,$$

where ỹ is the combined received signal vector, x is the common transmit signal vector, $\tilde{Q}$ and $\tilde{R}$ are resulting matrices from QR decomposition, and $\tilde{Q}^*$ is a transpose of $\tilde{Q}$.

7. A system for decoding a signal vector in a multiple-input multiple-output transmission scheme, comprising:

a receiver that receives multiple signal vectors of a first dimension ($N_r$) corresponding to a common transmit signal vector of a second dimension ($N_t$), wherein each of the received signal vectors is associated with a channel response matrix of dimension $N_r \times N_t$;

vector combining circuitry that concatenates K of the received signal vectors into a combined received signal vector of dimension $KN_r$, wherein K is an integer variable greater than one;

matrix combining circuitry that concatenates K of the channel response matrices into a combined channel response matrix of dimension $KN_r \times N_t$;

processing circuitry that processes the combined received signal vector to produce an equalized signal vector of dimension $N_t$, wherein $N_t<KN_r$; and a decoder that decodes the equalized signal vector using the combined channel response matrix.

8. The system of claim 7, wherein the vector combining circuitry concatenates the received signal vectors by creating a vector, ỹ, where $$\tilde{y} = [y_1^T y_2^T \ldots y_N^T]^T$$

and $y_i$ is an ith received signal vector corresponding to the common transmit signal vector, and wherein the matrix combining circuitry concatenates K of the channel response matrices by creating a matrix, H̃, where $$\tilde{H} = [H_1^T H_2^T \ldots H_N^T]^T,$$

and $H_i$ corresponds to the channel response matrix for an ith transmission of the common transmit vector.

9. The system of claim 7, wherein the processing circuitry processes the combined received signal vector by multiplying the combined received signal vector by $\tilde{H}^\dagger$, and wherein the decoder decodes the equalized signal vector by calculating a metric $$\frac{|[\tilde{H}^\dagger \tilde{y}]_k - [x]_k|^2}{[\tilde{H}^\dagger \tilde{H}^{\dagger *}]_{k,k}},$$

where $\tilde{H}^\dagger = (\tilde{H}^* \tilde{H})^{-1} \tilde{H}^*$, k indexes a kth component of a vector, and k,k indexes a $(k,k)^{th}$ component of a matrix.

10. The system of claim 7, wherein the processing circuitry calculates a matrix parameter from the combined channel response matrix and processes the combined received signal vector using the calculated matrix parameter to produce the equalized signal vector of dimension $N_t$, wherein $N_t<KN_r$.

11. The system of claim 10, wherein the processing circuitry calculates the matrix parameter by performing QR decomposition on the combined channel response matrix, and wherein the decoder calculates a metric $$\frac{|[\tilde{R}^{-1} \tilde{Q}^* \tilde{y}]_k - [x]_k|^2}{[\tilde{R}^{-1} \tilde{R}^{-*}]_{k,k}},$$

where $\tilde{Q}$ and $\tilde{R}$ are resulting matrices from QR decomposition, $\tilde{Q}^*$ is a transpose of $\tilde{Q}$, k indexes a kth component of a vector, and k,k indexes a $(k,k)^{th}$ component of a matrix.

12. The system of claim 10, wherein the processing circuitry calculates the matrix parameter by performing QR decomposition of the combined channel response matrix, and wherein the decoder calculates a metric $$\|\tilde{Q}^*\tilde{y}-\tilde{R}x\|^2,$$

where $\tilde{y}$ is the combined received signal vector, x is the common transmit signal vector, $\tilde{Q}$ and $\tilde{R}$ are resulting matrices from QR decomposition, and $\tilde{Q}^*$ is a transpose of $\tilde{Q}$.

13. A non-transitory computer readable medium encoded with computer executable instructions for decoding a signal vector in a multiple-input multiple-output transmission scheme, the computer executable instructions comprising instructions for:
  receiving multiple signal vectors of a first dimension ($N_r$) corresponding to a common transmit signal vector of a second dimension ($N_t$), wherein each of the received signal vectors is associated with a channel response matrix of dimension $N_r \times N_t$;
  concatenating K of the received signal vectors into a combined received signal vector of dimension $KN_r$, wherein K is an integer variable greater than one;
  concatenating K of the channel response matrices into a combined channel response matrix of dimension $KN_r \times N_t$;
  processing the combined received signal vector to produce an equalized signal vector of dimension $N_t$, wherein $N_t < KN_r$; and
  decoding the equalized signal vector using the combined channel response matrix.

14. The non-transitory computer readable medium of claim 13, wherein the instructions for concatenating the received signal vectors comprise instructions for creating a vector, $\tilde{y}$, where $$\tilde{y} = [y_1^T y_2^T \ldots y_N^T]^T$$

and $y_i$ is an ith received signal vector corresponding to the common transmit signal vector, and wherein the instructions for concatenating the channel response matrices comprise instructions for creating a matrix, $\tilde{H}$, where $$\tilde{H} = [H_1^T H_2^T \ldots H_N^T]^T,$$

and $H_i$ corresponds to the channel response matrix for an ith transmission of the common transmit signal vector.

15. The non-transitory computer readable medium of claim 13, wherein the instructions for processing the combined received signal vector comprise instructions for multiplying the combined received signal vector by $\tilde{H}^\dagger$, and wherein the instructions for decoding the equalized signal vector comprise instructions for calculating a metric $$\frac{\left|[\tilde{H}^\dagger \tilde{y}]_k - [x]_k\right|^2}{[\tilde{H}^\dagger \tilde{H}^{\dagger *}]_{k,k}},$$

where $\tilde{H}^\dagger = (\tilde{H}^* \tilde{H})^{-1} \tilde{H}^*$, k indexes a kth component of a vector, and k,k indexes a $(k,k)^{th}$ component of a matrix.

16. The non-transitory computer readable medium of claim 13 further comprising instructions for calculating a matrix parameter from the combined channel response matrix, wherein the instructions for processing the combined received signal vector comprise instructions for processing the combined received signal vector using the calculated matrix parameter to produce the equalized signal vector of dimension $N_t$, wherein $N_t < KN_r$.

17. The non-transitory computer readable medium of claim 16, wherein the instructions for calculating the matrix parameter from the combined channel response matrix comprise instructions for performing QR decomposition on the combined channel response matrix, and wherein the instructions for decoding the equalized signal vector comprise instructions for calculating a metric $$\frac{\left|[\tilde{R}^{-1} \tilde{Q}^* \tilde{y}]_k - [x]_k\right|^2}{[\tilde{R}^{-1} \tilde{R}^{-*}]_{k,k}},$$

where $\tilde{Q}$ and $\tilde{R}$ are resulting matrices from QR decomposition, $\tilde{Q}^*$ is a transpose of $\tilde{Q}$, k indexes a kth component of a vector, and k,k indexes a $(k,k)^{th}$ component of a matrix.

18. The non-transitory computer readable medium of claim 16, wherein the instructions for calculating the matrix parameter from the combined channel response matrix comprise instructions for performing QR decomposition on the combined channel response matrix, and wherein the instructions for decoding the equalized signal vector comprise instructions for calculating a metric $$\|\tilde{Q}^*\tilde{y}-\tilde{R}x\|^2,$$

where $\tilde{y}$ is the combined received signal vector, x is the common transmit signal vector, $\tilde{Q}$ and $\tilde{R}$ are resulting matrices from QR decomposition, and $\tilde{Q}^*$ is a transpose of $\tilde{Q}$.

19. A non-transitory computer readable medium encoded with computer executable instructions for decoding a signal vector in a multiple-input multiple-output transmission scheme, the computer executable instructions comprising instructions for:
  receiving multiple signal vectors of a first dimension ($N_r$) corresponding to a common transmit signal vector of a second dimension ($N_t$), wherein each of the received signal vectors is associated with a channel response matrix of dimension $N_r \times N_t$;
  concatenating K of the received signal vectors into a combined received signal vector of dimension $KN_r$, wherein K is an integer variable greater than one;
  concatenating K of the channel response matrices into a combined channel response matrix of dimension $KN_r \times N_t$;
  calculating a matrix parameter from the combined channel response matrix with processing circuitry, wherein the calculation comprises at least one of factoring the combined channel response matrix and inverting the combined channel response matrix;
  processing the combined received signal vector using the calculated matrix parameter to produce an equalized signal vector of dimension $N_t$, wherein $N_t < KN_r$; and
  decoding the equalized signal vector using the combined channel response matrix.

20. The non-transitory computer readable medium of claim 19, wherein the instructions for concatenating the received signal vectors comprise instructions for creating a vector, $\tilde{y}$, where $$\tilde{y} = [y_1^T y_2^T \ldots y_N^T]^T$$

and $y_i$ is an ith received signal vector corresponding to the common transmit signal vector, and wherein the instructions for concatenating the channel response matrices comprise instructions for creating a matrix, $\tilde{H}$, where $$\tilde{H} = [H_1^T H_2^T \ldots H_N^T]^T,$$

and $H_i$ corresponds to the channel response matrix for an ith transmission of the common transmit signal vector.

* * * * *